(12) United States Patent
Ostafew et al.

(10) Patent No.: US 11,215,987 B2
(45) Date of Patent: Jan. 4, 2022

(54) EXCEPTION SITUATION PLAYBACK FOR TELE-OPERATORS

(71) Applicants: Nissan North America, Inc., Franklin, TN (US); The University of Massachusetts, Boston, MA (US); Renault S.A.S., Boulogne-Billancourt (FR)

(72) Inventors: Christopher Ostafew, Mountain View, CA (US); Astha Vagadia, San Jose, CA (US); Najamuddin Baig, San Jose, CA (US); Viju James, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 138 days.

(21) Appl. No.: 16/427,742

(22) Filed: May 31, 2019

(65) Prior Publication Data
US 2020/0379457 A1    Dec. 3, 2020

(51) Int. Cl.
*G05D 1/00*    (2006.01)
(52) U.S. Cl.
CPC ......... *G05D 1/0038* (2013.01); *G05D 1/0061* (2013.01); *G05D 1/0088* (2013.01); *G05D 2201/0213* (2013.01)

(58) Field of Classification Search
CPC .. G05D 1/0038; G05D 1/0061; G05D 1/0088; G05D 2201/0213
See application file for complete search history.

(56) References Cited

U.S. PATENT DOCUMENTS

| | | | |
|---|---|---|---|
| 10,466,694 B1* | 11/2019 | Fairfield | G05D 1/0016 |
| 2014/0328578 A1* | 11/2014 | Shafron | H04N 21/63 |
| | | | 386/328 |
| 2018/0159979 A1* | 6/2018 | Amir | G06T 11/60 |
| 2018/0215344 A1* | 8/2018 | Santora | B60R 25/32 |
| 2018/0329411 A1* | 11/2018 | Levinson | G06Q 10/06 |
| 2018/0364702 A1* | 12/2018 | Liu | G07C 5/0816 |
| 2019/0080614 A1* | 3/2019 | Lee | G08B 25/08 |
| 2019/0196464 A1* | 6/2019 | Lockwood | G05D 1/0016 |

(Continued)

*Primary Examiner* — Anne Marie Antonucci
*Assistant Examiner* — Sahar Motazedi
(74) *Attorney, Agent, or Firm* — Young Basile Hanlon & MacFarlane, P.C.

(57) ABSTRACT

Resolving an exception situation in autonomous driving includes receiving an assistance request to resolve the exception situation from an autonomous vehicle (AV); identifying a solution to the exception situation; forwarding the solution to a tele-operator; receiving a request for playback data from the tele-operator; receiving, from the AV, the playback data; and obtaining, from the tele-operator, a validated solution based on the tele-operator using the playback data. The playback data includes snapshots $n_i$ of data related to autonomous driving stored at the AV at respective consecutive times $t_i$, for $i=1, \ldots, N$.

18 Claims, 14 Drawing Sheets

(56) References Cited

U.S. PATENT DOCUMENTS

| | | | |
|---|---|---|---|
| 2019/0355178 A1* | 11/2019 | Martinez | H04N 7/142 |
| 2020/0033853 A1* | 1/2020 | Ara Jo | G05D 1/0246 |
| 2020/0082890 A1* | 3/2020 | Karr | G06F 3/0679 |
| 2020/0192351 A1* | 6/2020 | Rastoll | G05D 1/0027 |
| 2020/0193736 A1* | 6/2020 | Lawrence | G05D 1/0088 |
| 2020/0232800 A1* | 7/2020 | Bai | G06T 15/00 |

* cited by examiner

EXCEPTION SITUATION PLAYBACK FOR TELE-OPERATORS

TECHNICAL FIELD

This application generally relates to autonomous vehicles and more particularly to tele-operation assistance in obstruction situations.

BACKGROUND

Autonomous vehicles (AVs) offer human drivers the convenience of efficient conveyance from one location to another without having to direct their attention to the state of the road. An AV can be defined as a self-driven (e.g., computer controlled) vehicle that is capable of driving on roadways while obeying traffic rules and norms. However, even the best autonomous vehicle programming cannot account for, and control, all conditions and situations that can arise during operation of the autonomous vehicle. Furthermore, there are times when the autonomous vehicle encounters conditions and situations that might benefit from the assistance of a human operator (e.g., a tele-operator).

SUMMARY

Disclosed herein are aspects, features, elements, implementations, and implementations for exception situation playback for tele-operators.

An aspect of the disclosed implementations includes a method for resolving an exception situation in autonomous driving. The method includes receiving an assistance request to resolve the exception situation from an autonomous vehicle (AV); identifying a solution to the exception situation; forwarding the solution to a tele-operator; receiving a request for playback data from the tele-operator; receiving, from the AV, the playback data; and obtaining, from the tele-operator, a validated solution based on the tele-operator using the playback data. The playback data includes snapshots $n_i$ of data related to autonomous driving stored at the AV at respective consecutive times $t_i$, for $i=1, \ldots, N$.

An aspect of the disclosed implementations includes a method for recording exception situations by an autonomous vehicle (AV). The method includes storing, in a memory, at consecutive times $t_i$ respective snapshots $n_i$ of data related to autonomous driving, wherein $i=1, \ldots, N$; identifying an exception situation occurring at time $t_{n+1}$; in response to determining that tele-operator assistance is not required, replacing a first snapshot $n_1$ with a new snapshot corresponding to the time $t_{n+1}$; and in response to determining that tele-operator assistance is required freezing the snapshots $n_i$, for $i=1, \ldots, N$, and transmitting the snapshots $n_i$ to an autonomous system.

An aspect of the disclosed implementations includes a system for resolving an exception situation in autonomous driving. The system includes a memory and a processor. The processor is configured to execute instructions stored in the memory to receive an assistance request to resolve the exception situation from an autonomous vehicle (AV); receive a request for playback data from the tele-operator; receive from the AV the playback data; and obtain, from the tele-operator, a validated solution based on the tele-operator using the playback data. The playback data include snapshots $n_i$ of data related to autonomous driving stored at the AV at respective consecutive times $t_i$, for $i=1, \ldots, N$.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
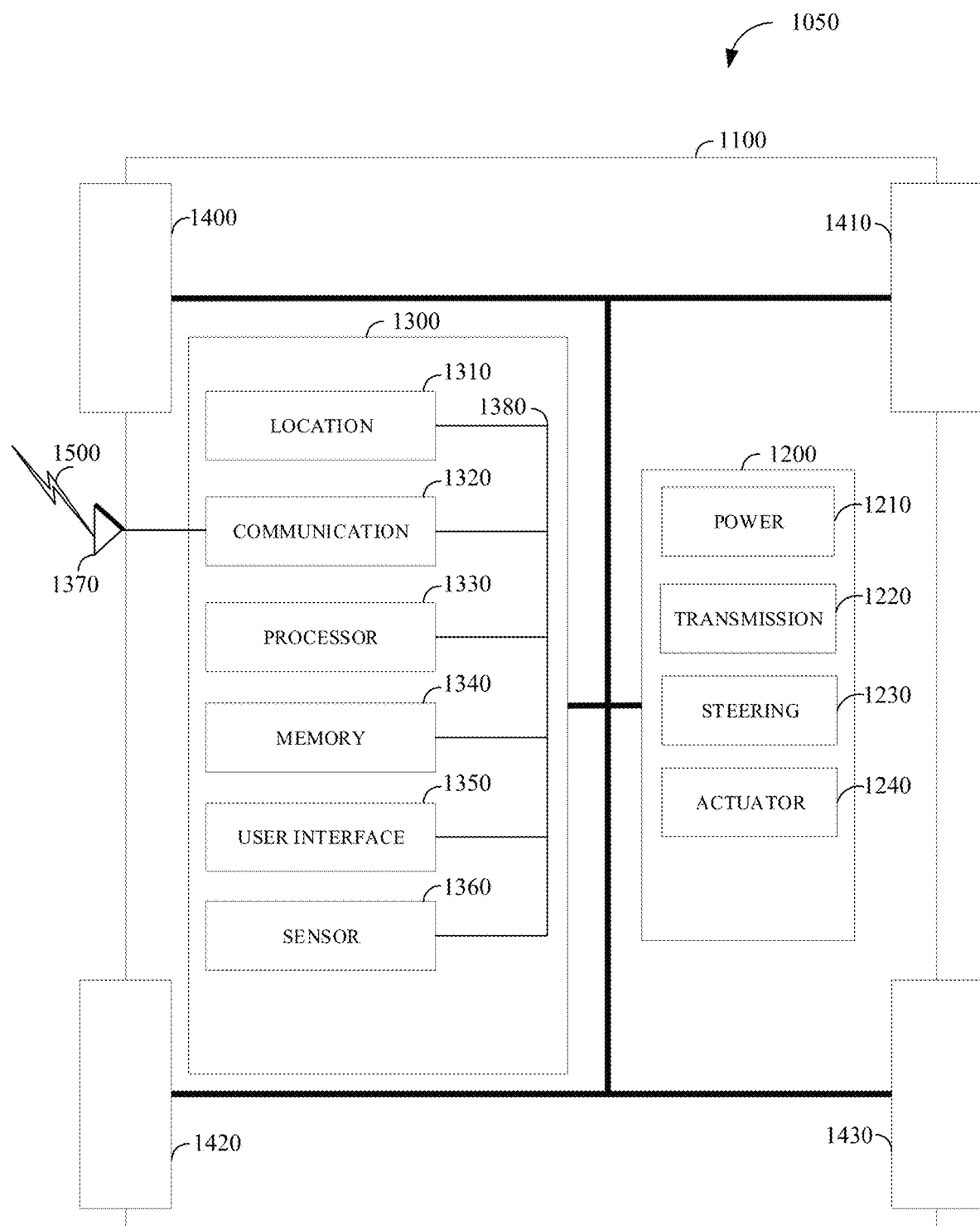
FIG. 1 is a diagram of an example of a portion of a vehicle in which the aspects, features, and elements disclosed herein may be implemented.

An autonomously driven vehicle (AV) may be unable to cope (or unable to cope with sufficient confidence) with many situations, which are referred to herein as exception or exception situations. Some situations may be outside the programming of the AV. For example, the AV may not be able to fully assess, classify, and/or understand the intentions of other road users. The other road users can include pedestrians, construction workers, policemen, construction equipment, vehicles, cyclists, or other static objects (e.g., buildings, road signs, etc.). For simplicity of explanation and reference, occupants (e.g., passengers) of the AV are also referred to herein as other road users. A solution can be generated by, or for, the AV to resolve (or deal with) the exception situation. The AV can then perform (e.g., execute) the solution.

Examples of exception situations can include that a passenger is engaged in prohibited behavior, that an item of a previous occupant is left behind in the AV, that a pick-up or a drop-off location of a passenger is an unmapped area, a road obstruction, that an activity related to a service provided by the AV is un-finished, or some other exception situation.

In the case of prohibited behavior, solutions can include notifying the passenger to cease the prohibited behavior, stopping the AV and notifying law enforcement, some other solution, or a combination thereof. In the case that an item of a previous passenger is left behind in the AV, solutions can include notifying the passenger of the lost item, sending the AV to a maintenance center for safe retrieval of the item and/or cleaning of the car, some other solution, or a combination thereof. In the case of an unmapped area, the solutions can include charting by a tele-operator a path for the AV, some other solution, or a combination thereof. Solutions to road obstructions situations can be as described below and can include a tele-operator authorizing or rejecting a path that is generated by the AV, or by an autonomous system, or charting a new path for the AV.

As mentioned above, in the case that an item of a previous passenger is left behind in the AV, solutions can include notifying the passenger. In an example, the modality for providing the notification can be based on a distance of the passenger from the AV, a determined value of a left-behind item, some other criterion, or a combination thereof. The notification modalities available for the vehicle to output the message, may include haptic feedback, one or more interior (e.g., inside the vehicle) luminous presentation units, one or more external luminous presentation units, one or more internal aural presentation units, one or more external aural presentation units, one or more electronic communication network control units, one or more velocity, kinetic state, or motion control units, or a combination thereof. Fewer, more, or other modalities can also be available.

The AV may be providing a service, such as a taxi service or a delivery service. Examples of un-finished activities related to the service provided by the AV can include that the customer did not close a compartment (e.g., a trunk, a door, etc.) of the vehicle upon retrieving an item of the customer; an incomplete payment (such as due to a declined credit card, an insufficient balance in a debit account, or the like) by the customer for the service; or some other un-finished activity.

In some cases, the AV can request assistance from a human user (i.e., a tele-operator, a mobility manager) to resolve the exception situation. In other cases, the AV can request assistance from an autonomous system, which can be remotely available to the AV. The autonomous system can be a network-based (e.g., cloud-based) system that is available to the AV. The autonomous system can determine a solution to the exception situation and transmit the solution to the AV. In some cases, the autonomous system can determine that a confidence level of the solution is low and, as such, forward the solution to a tele-operator before the solution is forwarded to the AV. The tele-operator can confirm, modify, or generate a new solution to the exception situation.

The autonomous system can be more capable than the AV itself. That is, the autonomous system may be able to resolve exception situations that the AV itself cannot (or cannot resolve with sufficient confidence). For example, the autonomous system may have additional programming than the AV, and/or may have available additional road information (such as from other vehicles within the vicinity of the AV) than may be available to the AV thereby enabling the autonomous system to use these additional data for resolving an exception situation. The additional programming can, for example, enable the autonomous system to recognize more features and features values in the scene of the exception situation than the AV can.

When the autonomous system encounters an exception situation that it cannot handle (e.g., resolve, negotiate, deal with), or cannot handle with sufficient confidence, the autonomous system can require (e.g., request) the assistance of a tele-operator (i.e., human assistance) to deal with the exception situation. The tele-operator can better judge (e.g., assess, evaluate, etc.) the situation so that the tele-operator can provide a new solution to the autonomous system or modify or confirm the solution generated by the autonomous system. The autonomous system, in turn, provides the solution to the AV. The AV can then respond according to the solution.

For ease of reference, a solution that is generated by the autonomous system is referred to as an automatic solution; and a solution that results from a tele-operator involvement is referred to as a validated solution. As such, if the tele-operator, after review of an automatic solution, does not modify the automatic solution, then the validated solution would be the same as the automatic solution. The tele-operator may modify the automatic solution or may generate a new solution. The modified solution and the new solution are also referred to as the validated solution.

As mentioned above, human judgement from the tele-operator can be used (i.e., used online) to solve exception situations faced by the AV in real time. In some examples, the human judgement can also be used offline to review the exceptions faced by the AV in the past, to annotate and label them (such as, in a language that is understandable by the autonomous system). In this way, the autonomous system can learn how to autonomously solve these or similar exceptions in the future, and thus expand the range of situations that can be handled automatically by the autonomous system.

As mentioned, assessing the road situation may be outside the sensing capabilities of the AV, such as in the case of identifying whether other road users are present around a corner that is obstructed by a building or whether other road users are present on the other side of a hill. Furthermore, resolving some other situations (e.g., obstruction situations) may require the AV to deviate from the normal (e.g., legal, socially acceptable) rules of driving in a manner that is unacceptable without human oversight. Road situations, with which an AV is unable to cope, are referred to herein as exception situations. As such, an exception situation can be a driving situation that requires that the AV suspend some driving norms in order to make forward progress (such as toward a final destination of the AV).

When the AV encounters an exception situation, the AV can stop and request assistance from a tele-operator. For example, when the AV encounters an obstruction (e.g., a construction site, a stopped vehicle, etc.) in a roadway, the AV might not go around the obstruction if doing so means that the AV will travel through an area that is physically safe but is restricted by traffic regulations. Accordingly, a tele-operator (e.g., a human operator, a vehicle manager, a mobility manager) can be tasked with assisting the AV in negotiating its problematic situation by, for example, mapping a path (i.e., a trajectory) for the AV around the obstruction. The tele-operator may be one of many tele-operators that are available at a tele-operation center (i.e., a remote vehicle assistance center) where each tele-operator can monitor the state or condition of one or more AVs.

However, a stopped AV (such as in the middle of a road) can present a public nuisance or result in dangerous and unsafe road conditions. As such, even when tele-operator assistance is requested and/or provided, the tele-operators must respond to a request for assistance quickly.

In an experiment, during a three-hour drive in the San Francisco area, an AV encountered 19 exception situations that required resolution by a tele-operator. On average, it took the tele-operator one minute per exception situation to assess the exception situation (such as based on information received from the AV) and map a path for the AV. As such, on average, 11% (i.e., 19/3/60≈11%) of the day is spent resolving exception situations for one AV. In San Francisco, 45,000 vehicles are registered to provide taxi services. It is expected that in the not-too-distant future, taxi service can be provided only by autonomous vehicles. As such, and assuming that one tele-operator can be dedicated to managing 10 AVs, in the city of San Francisco alone, 450 tele-operators will be required. Such a model (i.e., a model that heavily depends on human intervention) is not practical, sustainable, profitable, or efficient.

In the description above, upon encountering an exception situation, an AV stops and requests tele-operator assistance. The tele-operator assistance model may require many tele-operators and a significant amount of time to resolve each exception situation.

Implementations according to this disclosure can reduce the need for tele-operation support (e.g., intervention). The need for tele-operation support can be reduced by reducing the time that is required by a tele-operator to resolve (e.g., respond to) an exception situation. The need for tele-operation support can be reduced by reducing the number of exception situations that require tele-operator support, such as by providing a trajectory for an AV.

When an AV encounters an obstruction situation, the AV can classify the obstruction situation into a normal situation or an exception situation. If the obstruction situation is classified as a normal situation, the AV can autonomously negotiate (e.g., go around) the obstruction situation. If, on the other hand, the obstruction situation is classified as an exception situation, the AV can determine (e.g., select, calculate, map, etc.) a trajectory (i.e., a path) around the exception situation and determine a risk for the path. In some situations, the trajectory around the exception situation can merely be that the AV comes to a complete stop until the exception situation has resolved itself.

The risk can be numerical number (such as a percent, a number between 0 and 1, a number between 0 and 10, or some other number). In another example, the risk can be an ordinal label (such, as "normal," "low," or "high" "green," "yellow," or "red;" etc.). If the risk is below a risk threshold (e.g., less than "high," less than 75%), then the AV can autonomously proceed along the path. On the other hand, if the risk is not below the risk threshold, the AV can issue a request to a tele-operator. The request can include the path. The tele-operator can merely approve the path. As such, if the AV receives approval of the path, the AV can autonomously proceed along the path.

In an implementation, some systems and techniques disclosed herein can be summarized as follows. As an AV is driving autonomously without human supervision, the AV may encounter an obstruction. The obstruction can be a new object, which can be another road user, a static object, or another object. For example, the obstruction can be a leading vehicle (i.e., a vehicle that is driving in front of the AV) that has come to a stop. In response to the obstruction, the AV determine a path around the obstruction. If no path is possible, then the AV can come to a halt and wait for the obstruction to clear. This is referred herein as the wait response. If a path is possible, the AV can evaluate a risk associated with autonomously going around the obstruction using the path. Based on the risk, the AV can perform a response whereby the AV can, if the risk is less than a risk threshold, (a) autonomously go around the obstruction in normal manner; or if the risk is not less than the risk threshold, (b) contact a tele-operator for assistance. For ease of reference, the responses (a)-(b) can be referred to, respectively, as a normal response, and an assistance response. As such, the possible responses of the AV to an obstruction can include a wait response, a normal response, and an assistance response.

In the case of a wait response, the AV comes to a complete stop and can re-evaluate the situation over time. Depending on how the situation changes over time, the AV can either continue to wait, autonomy go around the obstruction, or contact a tele-operator. In an example, if the obstruction situation does not resolve itself within a predefined period of time, the AV can perform an assistance response. In an example, the obstruction situation may change such that the AV can perform either a normal response or an assistance response.

The AV may be programmed to remain in a single lane (e.g., single-lane constraint). However, when encountering an obstruction, the AV can relax (e.g., release) the single-lane constraint and autonomously go around the obstruction, when permitted by a gap in other traffic. If no gap in traffic exists, the AV comes to a halt and waits, or remains waiting, until the situation changes (e.g., the obstruction clears, a gap in traffic, etc.).

In the case of an assistance response (i.e., the AV contacts a tele-operator for assistance), the AV contacts a tele-operation center for assistance and comes to a controlled halt behind the obstruction while waiting for a response from a tele-operator at the tele-operation center.

The request for assistance can include an AV-suggested action. In an example, the AV-suggested action can be to go around the obstruction using a trajectory (e.g., a path) that is mapped by the AV. In an example, the trajectory can be a new route to a destination of the AV. The trajectory that is mapped by the AV can be included in the request for assistance. The response from the tele-operator can be an authorization to the AV to perform the AV-suggested action, also referred to herein as a "proceed response" or a "response to proceed;" to continue to wait, also referred to herein as a "wait response" or a "response to wait;" to go around the obstruction using a trajectory that is provided by the tele-operator, also referred to herein as a "trajectory response" or a "response that includes a trajectory"; or some other response. If the tele-operator approves the AV-suggested action of going around the obstruction, the AV may temporarily allow itself into an opposite-traffic lane and continue around the obstruction autonomously.

In an implementation, the assistance response can be in the form of an issuance by the AV of a ticket. The ticket can be assigned to a tele-operator at the tele-operation center. The ticket can be assigned to a specific tele-operator who may be selected based on expertise of the tele-operator, a geographical location of the AV, state information of the AV, information regarding the obstruction situation, or some other criteria. In another implementation, the ticket may be placed in a first-in-first-out queue and is assigned to a next available tele-operator.

In the above mentioned 19 exception situations, and using the techniques described herein, roughly 50% were determined to have a risk below the risk threshold. Accordingly, by autonomously (i.e., without tele-operator intervention) resolving such obstruction situations, the total tele-operation time can be reduced by 50%. Additionally, by reducing the tele-operator time needed, at least in some situations, to a mere approval of the AV-proposed path (i.e., the tele-operator only needs to approve an action most of the time, and does not need to closely direct the AV, such as by mapping a path for the AV), additional reduction in tele-operation time can be achieved. Accordingly, implementations according to this disclosure can reduce tele-operation time for a fleet of AVs. For example, the ratio of AVs to tele-operators required can be reduced from 10:1 to 40:1 (e.g., from 1 tele-operator for every 10 AVs to 1 tele-operator for every 40 AVs). As such, tele-operation costs for exception handling by be reduced by 75%.

In some implementations, to further reduce tele-operator involvement in cases where an AV cannot resolve an exception situation on its own, an autonomous system can generate a solution (i.e., an automatic solution). If a confidence level in the solution is below an automated-solution threshold, the solution can then be forwarded to the tele-operator for review. Otherwise, the solution can be transmitted to the AV. That is, the AV can issue a request for assistance (such as via a ticket); the autonomous system can generate a solution; if the confidence level in the solution is sufficiently high, then the solution can be transmitted to the AV; and if the confidence level in the solution is not sufficiently high, then a tele-operator can review (and possibly modify) the solution and or generate a new solution.

Said yet another way, once the autonomous system has assessed the situation, the autonomous system can generate a solution (i.e., an automatic solution) to be sent to the AV; different criteria could be used to determine whether the automatic solution is to be sent directly to the AV or not. If not, the ticket would be submitted to a tele-operator for review. The AV sensor data, the values for the different features and the automatically generated solution can also be sent to the tele-operator to help the tele-operator assess the situation faster and for tele-operator to base his/her solution on the automatic solution generated by the autonomous system if tele-operator deems the automatic solution to be good enough (which may be subjective judgement). In some examples, the tele-operator can also have the role of giving feedback to the autonomous system on the evaluation of the autonomous system of the different features as well as the automatic solution.

When an exception situation is encountered by the AV, the AV can transmit telemetry data and/or sensor data to the autonomous system. For example, the AV can transmit, and the autonomous system can receive, camera images, LiDAR point clouds, the GPS location of the AV, the speed of the AV, more, fewer, other data, or a combination thereof. Feature and feature values can be extracted using the received data. Examples of features and feature values are described below.

The autonomous system (and/or a tele-operator) can use the features and the feature values to assess the exception situation and to generate a solution to the exception situation. In some examples, the autonomous system can use additional data in assessing the exception situation and/or in generating the solution. Examples of additional data can include construction zones information, and/or information accessible to the autonomous system, which are received from other vehicles.

In some examples, the tele-operator can playback the last number of seconds (e.g., 10 seconds) preceding an exception situation. The playback enables a tele-operator to review historical information immediately preceding the exception situation. The playback enables the tele-operator to become situationally aware faster than simply viewing a real-time stream of data and/or static information captured at the time that the exception situation is identified (e.g., detected, recognized, etc.) by the AV. In addition to becoming situationally aware faster than simply viewing a real-time stream and/or static snapshots of the exception situation, the playback may also reveal information no longer apparent in the current scene, such as the cause of the exception situation. For example, the cause of the exception may have been visible at some point in the past but is now obscured by other road users.

An autonomous system according to implementations of this disclosure can provide advantages including automatically finding better solutions to given situations once the feature set has been automatically evaluated. For example, using offline training, the autonomous system can refine the feature values that the autonomous system assigns to the different features, or can be taught to identify new features and/or new feature values, thereby improving the ability of the autonomous system to assess an exception situation. Additionally, by leveraging the tele-operator knowledge, skills, and downtime for offline training, the autonomous system can learn to automatically solve more and more exception situations thereby requiring less tele-operator involvement for some exception situations. As such, tele-operators can focus on harder situations as their expertise would not be required for easier and/or learned situations.

To describe some implementations in greater detail, reference is made to the following figures.

FIG. 1 is a diagram of an example of a vehicle 1050 in which the aspects, features, and elements disclosed herein may be implemented. The vehicle 1050 includes a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including the operations center. The instructions for remote operation may be stored in the vehicle 1050 or received from an external source such as a traffic management center, or server computing devices, which may include cloud-based server computing devices. The processor 1330 may be configured to execute instructions for exception handling as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
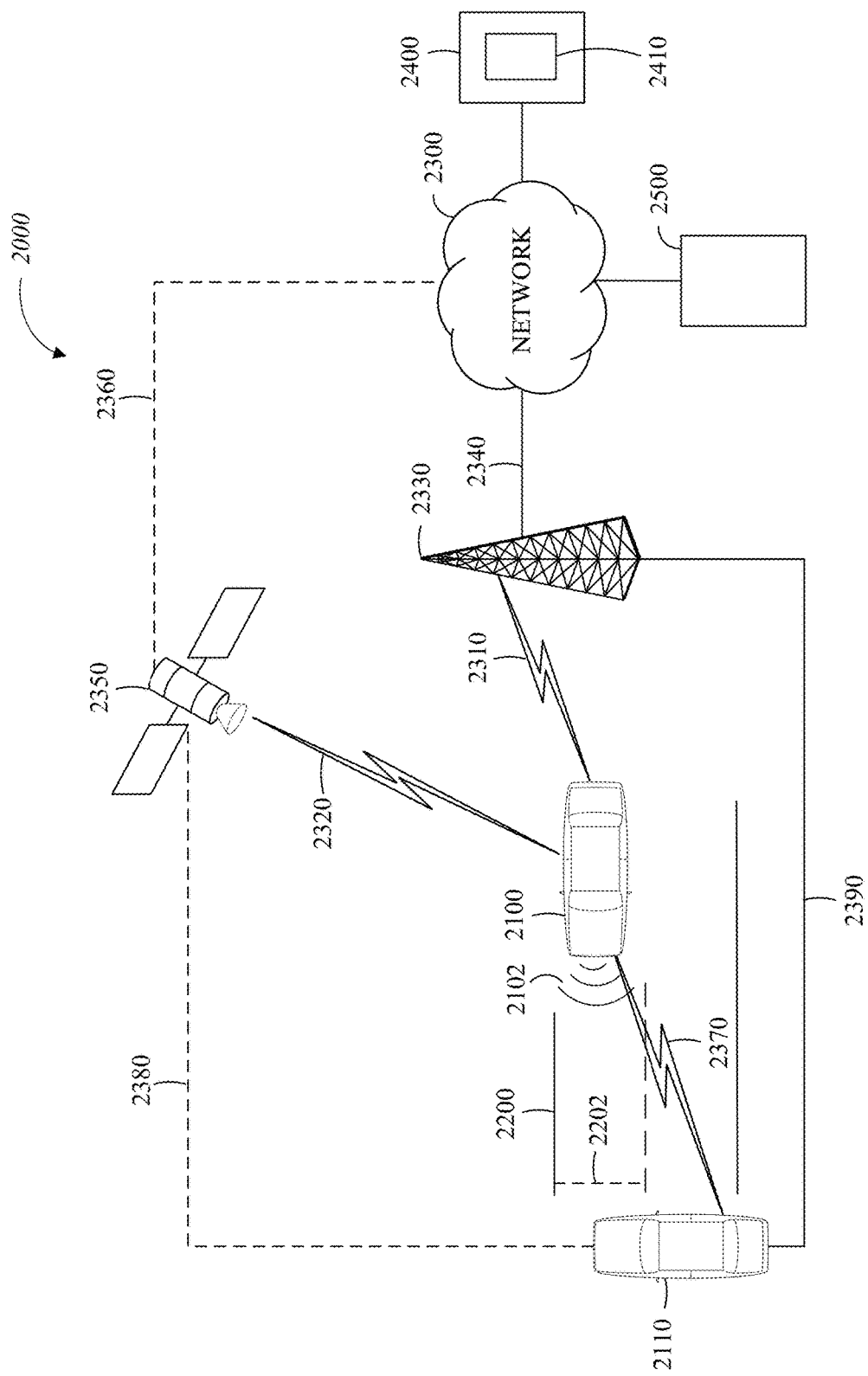
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center

2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
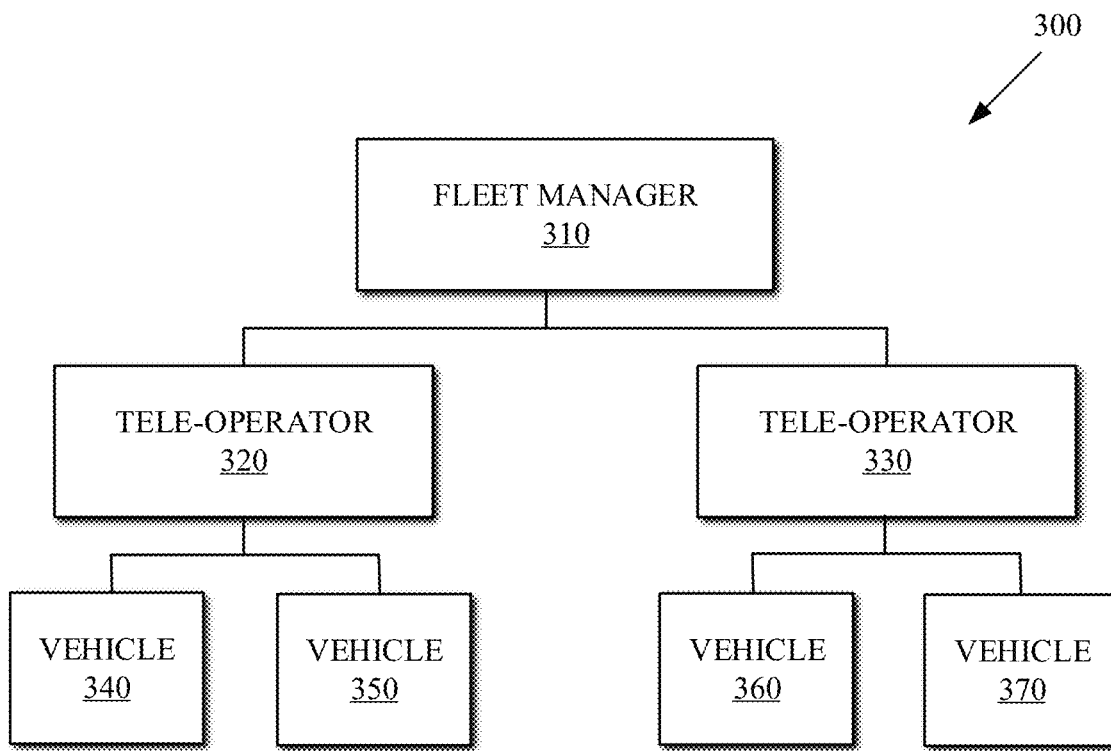
FIG. 3 is a block diagram illustrating a remote vehicle assistance center according to implementations of this disclosure.

FIG. 3 is a block diagram illustrating a remote vehicle assistance center 300 according to implementations of this disclosure. The remote vehicle assistance center 300 can also be referred to as a remote system or a tele-operations center. The remote vehicle assistance center 300 includes a fleet manager 310, a plurality of vehicle managers (i.e., tele-operators) including but not limited to a tele-operator 320 and a tele-operator 330, and a plurality of vehicles including but not limited to vehicles 340, 350, 360, and 370.

The fleet manager 310 can include an apparatus including some or all of the features of the controller 1300 shown in FIG. 1 or the controller apparatus 2410 of FIG. 2. The fleet manager 310 can monitor and coordinate tele-operators, including the tele-operators 320/330 as well as the movement of vehicles, including autonomous vehicles, and the vehicles 340/350/360/370. Monitoring and coordinating the tele-operators can include any of: assigning, allocating, or deallocating, vehicles to the tele-operators; reviewing and monitoring performance data of the tele-operators; and assigning tele-operators to a geographic area. In an implementation, there can be multiple fleet managers, who may in turn be managed or under the authority of other fleet managers.

The tele-operator 320 can monitor the state or condition of vehicles, including the vehicle 340 and the vehicle 350. As illustrated in FIG. 3, the tele-operator 320 has been assigned vehicle 340 and vehicle 350. The assignment of vehicles to a tele-operator can be performed by a fleet manager such as the fleet manager 310.

The tele-operator 330 can monitor the state or condition of vehicles, including the vehicle 360 and the vehicle 370. As illustrated in FIG. 3, the tele-operator 330 has been assigned vehicle 360 and vehicle 370. The assignment of vehicles to a tele-operator can be performed by a fleet manager such as the fleet manager 310. The assignment of vehicles to a tele-operator can also be automated using machine learning techniques.

In an implementation, the tele-operators can cluster or group the vehicles, establish communication with occupants in the vehicle, remotely operate the vehicles, and coordinate the movement of the vehicles through a transportation network or around various obstacles such as traffic congestion. The tele-operators can interact with other tele-operators to aid in the monitoring and management of the vehicles.

The vehicles including the vehicle 340/350/360/370 comprise vehicles such as the vehicle 2100 as shown in FIG. 2, that are being monitored or coordinated by the fleet manager 310. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the controller apparatus 2410 of FIG. 2 and may be partially or fully executed by a processor of the AV, a processor of an operations center, or a combination thereof. For example, the statement "the AV determines a trajectory" can be understood to mean that "a module of the AV determines a trajectory" or "a trajectory planning module of the AV determines a trajectory."

Figure 4:
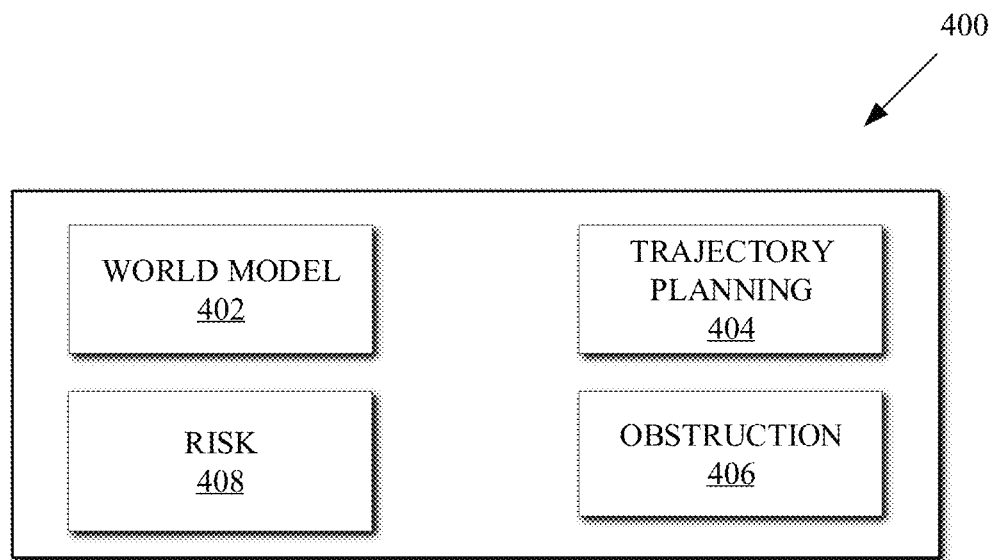
FIG. 4 is an example of modules of a system for exception handling according to implementations of this disclosure.

FIG. 4 is an example of modules of a system 400 for exception handling according to implementations of this disclosure. The system 400 can be included in a vehicle (e.g., an autonomous vehicle) including the vehicle 1050 shown in FIG. 1, the vehicle 2100 shown in FIG. 2, one of the vehicles 340/350/360/370 of FIG. 3. The system 400 can be stored in a memory, such as the memory 1340 of FIG. 1, as computer executable instructions that can be executed by a processor, such as the processor 1330 of FIG. 1.

The system 400 includes a world model module 402, a trajectory planning module 404, an obstruction manager module 406, and a risk evaluation module 408. Other examples of the system 400 can include more, fewer, or other modules. In some examples, some of the modules can be combined; in other examples, a module can be divided into one or more other modules. For example, the risk evaluation module 408 may be combined with the obstruction manager module 406. The modules, or a subset therefrom, of the system 400 can be referred to as an exception handling module.

The world model module 402 can receive sensor data, such as from the sensor 126 of FIG. 1, and determines (e.g., converts to, detects, etc.) objects from the sensor data. That is, for example, the world model module 402 can determine the road users (e.g., one or more external objects or external object 2110, as described with respect to FIG. 2) from the received sensor data. For example, the world model module 402 can convert a point cloud received from a light detection and ranging (LiDAR) sensor (i.e., a sensor of the sensor 126) into an object. Sensor data from several sensors can be fused together to determine (e.g., guess the identities of) the objects. Examples of objects include a bicycle, a pedestrian, a vehicle, a structure, etc. The objects maintained by the world model module 402 can include static objects and/or dynamic objects. A dynamic object is a world object that is currently moving. A static object can be any non-moving object. A building or a traffic sign can be examples of static objects. A static object can be an object that was previously classified as a dynamic object; or vice versa.

The world model module 402 can receive sensor information that allows the world model module 402 to calculate and maintain additional information for at least some of the detected objects. For example, the world model module 402 can maintain a state for at least some of the determined objects. For example, the state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model module 402 can fuse sensor information, can track objects, can maintain lists of hypotheses for at least some of the dynamic objects (e.g., an object A might be going straight, turning right, or turning left), can create and maintain predicted trajectories for each hypothesis, and can maintain likelihood estimates of each hypothesis (e.g., there is a 90% probability that object A will go straight, considering object A's pose/velocity and the trajectory poses/velocities).

In an example, the world model module 402 uses one or more instances of the trajectory planning module 404 to generate the predicted trajectories for each object hypothesis for at least some of the dynamic objects. For example, an instance of the trajectory planner can be used to generate predicted trajectories for vehicles, bicycles, and pedestrians. In another example, an instance of the trajectory planner can be used to generate predicted trajectories for vehicles and bicycles, and a different method can be used to generate predicted trajectories for pedestrians.

The trajectory planning module 404 can generate a trajectory (i.e., a path) of a vehicle by detecting (e.g., sensing, observing, etc.) the presence of static objects and anticipating (i.e., predicting) the trajectories of other users (e.g., road users, dynamic objects) of the vehicle transportation network. The trajectory planning module 404 can generate a trajectory for the AV, from a source location to a destination location, by, for example, receiving map data, teleoperation data, and other input data; stitching (e.g., fusing, connecting, etc.) the input data longitudinally to determine a speed profile for a path from the source location to the destination location (e.g., the speed profile specifying how fast the AV can be driven along different segments of the path from the source location to the destination location); and, at discrete time points (e.g., every few milliseconds), having the trajectory planner process constraints related to static and dynamic objects, which are observed based on sensor data of the AV, to generate a smooth trajectory for the AV for the next time window (e.g., a look-ahead time of 6 seconds).

The trajectory planning module 404 can determine a next-few-seconds trajectory. As such, and in an example where the next few seconds are the next 6 seconds (i.e., a look-ahead time of 6 seconds), the trajectory planning module 404 can determine a trajectory and locations for the AV in the next 6 seconds. For example, the trajectory planning module 404 may determine (e.g., predict, calculate, etc.) the expected locations of the AV at several time intervals (e.g., every one-quarter of a second, or some other time intervals). The trajectory planning module 404 can determine the detailed-planned trajectory based on predictable responses of other road users.

In an example, the world model module 402 can use an instance of the trajectory planning module 404 to generate the predicted trajectories for each object hypothesis for at least some of the dynamic objects. For example, an instance of the trajectory planning module 404 can be used to generate predicted trajectories for vehicles, bicycles, and pedestrians. In another example, an instance of the trajectory planning module 404 can be used to generate predicted trajectories for vehicles and bicycles, and a different method can be used to generate predicted trajectories for pedestrians.

The trajectory planning module 404 can receive the anticipated (i.e., predicted) trajectories of other users of the vehicle transportation network (also referred to as real-world objects) from the world model module 402. For each detected dynamic object (e.g., a real-world object, such as a vehicle, a pedestrian, a bicycle, and the like), the world model module can maintain (e.g., predict and update) one or more hypothesis regarding the possible intentions of the real-world object. Examples of intentions (e.g., hypotheses) include stop, turn right, turn left, go straight, pass, and park. A likelihood is associated with each hypothesis. The likelihood is updated based on observations received from sensor data.

In an example, to determine a path for the next time window (such as to go around an obstruction), the trajectory planning module 404 can determine a drivable area and a discrete-time speed plan for the next time window. The drivable area can be, for example, the area of a vehicle transportation network where the AV can be driven. Initially, the drivable area may include areas where the AV cannot be predicted to be safely driven. The trajectory planning module 404 cuts out of the drivable area those areas where the AV cannot be predicted to be safely driven. This process results in an adjusted drivable area. The adjusted drivable area can include areas that violate traffic norms.

The trajectory planning module 404 can identify nearby objects to the AV. In an example, the nearby objects can be at least some of the external objects maintained by the world model module 402. For example, the nearby objects can be objects within a predetermined distance from the AV, objects within a predicted arrival time of the AV, or objects that meet other criteria for identifying a subset of the objects, such as objects that constitute the obstruction situation.

The trajectory planning module 404 determines an adjusted drivable area. The "adjusted drivable area" is the drivable area after areas have been removed from the drivable area to account for static and/or dynamic objects. For example, in determining the adjusted drivable area, the trajectory planning module 404 can consider any objects that caused the obstruction situation, oncoming vehicle, and other road objects that may be in the proximity (coming from behind, on the left, on the right, etc.) of the AV.

The trajectory planning module 404 adjusts the drivable area for static objects. That is, the trajectory planning module 404 removes (e.g., cuts out, etc.) from the drivable area those portions of the drivable area where static objects are located. This is so because the AV is to be controlled to navigate (e.g., drive) around the static objects. It is noted that an object that is currently classified as static object may have been classified as a dynamic object at a previous time instant and may become a dynamic object at a future time instant. The size of the cut-out area can be determined based on an estimate of the size of the static object. The size of the cut-out area can include a clearance area so that the AV does not drive too close to the static object.

The trajectory planning module 404 can adjust the discrete-time speed plan for static objects. For example, in the absence of obstacles or other road users, the discrete-time speed plan can follow a predetermined speed profile. For example, when the adjusted drivable area contains a narrow pass, accounting for static objects, instead of following (i.e., using the speed of) the strategic profile verbatim (i.e., as set in the strategic profile), the trajectory planning module 404 adjusts the discrete-time speed plan to reduce the speed of the AV to a comfortable speed. For example, when the adjusted drivable area, accounting for static objects, contains a static blockage (e.g., an obstruction situation), the trajectory planning module 404 adjusts the discrete-time speed plan such that the AV comes to a stop a prescribed distance before the static blockage.

The trajectory planning module 404 can then adjust the drivable area for dynamic objects. That is, the trajectory planning module 404 cuts out portions of the drivable area based on the respective predicted trajectories of each of the dynamic objects. The trajectory planning module 404 can use timing information regarding locations of each of the dynamic objects to cut out additional portions of the drivable area. The cutouts in the drivable area for dynamic objects are generated by comparing the timing of the predictions for the dynamic objects compared to the timing generated by the discrete-time speed plan, which now accounts for static objects. That is, the trajectory planning module 404 can predict for a dynamic object, and, based on the predicted trajectory of the dynamic object, where the dynamic object will be located at different discrete points in time relative to the locations of the AV at the same discrete points in time. The locations of a dynamic object are matched to the predicted locations of the AV to determine cutout portions.

The trajectory planning module 404 can then perform an optimization operation(s), such as a constrained operation, to determine an optimal trajectory for the AV. The trajectory planning module 404 can use (i.e., as inputs to the optimization operation) the motion model (e.g., the kinematic motion model) of the AV, a coarse driveline (e.g., a line in the road over which the longitudinal axis of the AV coincides as the AV moves along the road), and the adjusted drivable area, more, fewer, or other inputs to calculate (e.g., determine, generate, etc.) an optimal trajectory for the AV.

The obstruction manager module 406 can identify the obstruction situation. For example, if the obstruction manager module 406 detects that the trajectory (i.e., a first trajectory) of the AV, as determined by the trajectory planning module 404 is blocked, then after a predetermined period of time (e.g., a few seconds), the obstruction manager module 406 can cause the trajectory planning module 404 to generate a second trajectory by relaxing traffic norms. The first trajectory may have been generated without violating traffic norms. For example, in deriving the drivable area, the trajectory planning module 404 may have excluded opposite direction road lanes and/or off-road areas. In generating the second trajectory, the obstruction manager module 406 can direct the trajectory planning module 404 to use areas that the trajectory planning module 404 considered non-drivable areas when generating the first trajectory.

The obstruction manager module 406 can cause the risk evaluation module 408 to assess a risk associated with the obstruction situation, with the second trajectory, or a combination thereof. In the case that the risk associated with the second trajectory being greater than a risk threshold, the obstruction manager module 406 can initiate a request to a tele-operator, as further described below. The obstruction manager module 406 can receive a response from the tele-operator and cause the AV to be operated according to the response. As mentioned above, the response of the tele-operator can be a wait response, a proceed response, a response that includes a trajectory, or some other response, as further described below.

The risk evaluation module 408 determines a risk associated with the obstruction situation, with the trajectory, or a combination thereof. In a first example, the risk can be considered to be a measure of understanding by the AV (such as based on received sensor data, high definition (HD) map data, and other data that may be available to the AV) of the obstruction scene. The ease of reference, the measure of understanding by the AV of the obstruction scene can be referred to as a situation likelihood value, or simply a situation likelihood. In a second example, the risk can be a based on a weighting of the situation likelihood and the consequence(s) of following the second trajectory, which is generated by the trajectory planning module 404 as described above. Other ways of measuring risk are possible.

In the first example, the risk evaluation module 408 determines the risk based on values of features that can be important and/or relevant to resolving the exception situation. The features can include whether any other world objects are present in the scene, the state information of the other world objects, the location of the AV on an HD map, the speed of the AV, the visibility from the AV, specific features regarding stopped vehicles, fewer information, additional information, other information, or a combination thereof. At least some of the features and/or feature values can be based on at least some of the telemetry data that are received from the AV, such as camera images, LiDAR point cloud(s), radar measurement(s), and the like.

For example, features regarding other world objects can include whether there are any of vehicles, bicycles, pedestrians and their respective numbers, whether a world object was previously detected or is a new object, and/or whether a previously detected object was previously determined to be moving (e.g., whether the classification of the detected object has changed from dynamic to static). For example, prior observations that a vehicle was moving but is now stopped can indicate that the vehicle is likely to move again. The location of the AV on the HD map can include the type of road, the presence of traffic signs (e.g., traffic lights, stop signs, etc.), intersections, and the like. The visibility from the AV can include whether the view of the AV is blocked (such as by a stopped vehicle), the presence of a hill, and the like. Other features regarding stopped vehicles can include, to the extent that they are perceived and detected using sensor information, whether hazard lights are on, whether and which doors are open, whether pedestrians are loading or unloading, and the like. The determined risk value can be a weighted combination of the feature values.

The presence of pedestrians in the scene can increase the risk. An unobstructed view of the AV can lower the risk. Uncertainty (or degrees of uncertainty) regarding classification of objects can increase the risk. For example, while a vehicle may be parked, it may not be possible to determine whether the vehicle is permanently stopped (such as because it has broken down) or whether it is temporarily parked (such as at an intersection). A degree of certainty may be associated with whether an object is permanently stopped. Other indicia can be used in determining the risk of whether the vehicle is permanently or temporarily stopped. For example, detecting pylons and/or flashing hazard lights can increase the certainty that the vehicle is permanently stopped. For example, the longer the vehicle has been stopped, the higher the chances that is vehicle is permanently stopped. Bad (snowy, foggy, etc.) weather conditions can increase the risk. For example, that a vehicle is observed (e.g., determined, assessed, etc.), such as based on HD map data, to be stopped at an intersection can indicate that the vehicle is more likely to be yielding to other traffic. As such, the vehicle is likely to move again; unless it is observed to be stationary for a sustained time in excess of normal yield times at that intersection.

In an example, that a leading vehicle was previously determined to move (and therefore is highly likely to continue moving) can cause the AV to select a strategy to wait, rather than go around the vehicle. However, if the leading vehicle is not determined to have moved for a predetermined period of time (e.g., 2 minutes, 3 minutes, or some other stop time), then a risk associated with the second trajectory can be determined.

In the second example, and as mentioned above, the risk evaluation module 408 can determine the risk based on a weighting (e.g., a product) of the situation likelihood value and the consequences of following the second trajectory, which is generated by the trajectory planning module 404 as described above. The risk evaluation module 408 can be thought of as computing the risk of allowing the AV to go around the obstruction without remote human supervision. The risk can be a measure of the likelihood of an outcome weighted by the social cost of that outcome. Mathematically, given possible outcomes $\{Y_i\}$ (e.g., the obstruction moves while AV is going around it), with likelihoods $\{P_i\}$ and 'social cost' $\{C_i\}$, the risk can be computed as risk=max_i $\{P_i * C_i\}$.

For example, assume that a person is detected in the obstruction scene. A person in the scene (who is not a normal pedestrian crossing the road) elevates risk at least because i) it is unknown if that person is a legitimate traffic director (e.g., traffic policeman or construction worker) and ii) ignoring, or ignoring the instructions of, a legitimate traffic director may have a high cost. If the person is in fact a policeman but is not so classified (such as by the world model module 402) with complete certainty, then the consequences of ignoring the policeman's instruction are high.

In the second example, the risk can be described as the risk of the AV making a decision (e.g., a decision to follow a trajectory) based on the AV's own understanding of the obstruction situation and without any further input (such as from a human tele-operator). Said another way, the computation of the risk is based on the selected action of the AV. The selected action of the AV is essentially the action to proceed according to the second trajectory. Said yet another way, the risk can be calculated based on the AV's understanding of the situation. A lack of knowledge (i.e., understanding) can imply that unwelcome outcomes (e.g., disobeying a traffic policeman) cannot be eliminated and therefore must be considered as possible.

The risk evaluation module 408 can estimate one or more situation likelihood values, each associated with combinations of possible feature values. The features in the scene can be used to inform of possible outcome likelihoods and costs. For example, if there is a clear view ahead and sufficient space, the cost of overtaking an obstruction that moves is likely low. For example, if the obstruction has hazard lights on, the likelihood of it moving is likely low as well. Consequently, the risk is very (e.g., risk=low*low=(very low)). For example, if a person is identified in a scene, one situation likelihood value may be associated with the person being a policeman and a second situation likelihood value may be associated with the person being a construction worker. Additionally, whereas one second trajectory is described above, more than one second trajectory can be generated by the trajectory planning module 404 and consequences associated with each of the second trajectories evaluated. The final risk evaluation (e.g., the risk value provided by the risk evaluation module 408) can be the worst case risk associated with the set of considered outcomes. That, the risk can be the minimum (i.e., riskiest) of all the calculated risk values.

The product, as shown in Table I, of the situation likelihood value and a consequence value can be used as the risk value. In Table I, which is reminiscent of a Risk Assessment matrix, the situation likelihood value is shown as having three values (i.e., low, medium, high) and the consequence value is also shown as having three values (i.e., low, medium, high). However, as a person skilled in the art recognizes more or less values (labels or numerical values) can be assigned to situation likelihood value and/or the consequence value. In the case that numerical values are used, the risk can be determined as the multiplying the situation likelihood value by the consequence value. An example, of risk assessment matrix is shown in Table I.

TABLE I

| | | Situation Likelihood | | |
|---|---|---|---|---|
| | | Low | Medium | High |
| Cons | High | Yellow | Red | Red |
| | Medium | Green | Yellow | Red |
| | Low | Green | Green | Yellow |

Table I illustrates that the risk is identified as "Green" in situations where the situation likelihood/consequence value combinations are determined to be Low/Medium, Low/Low, and Medium/Low; the risk is identified as "Yellow" in situations where the situation likelihood/consequence value combinations are determined to be Low/High, Medium/Medium, and High/Low; and the risk is identified as "Red" in situations where the situation likelihood/consequence value combinations are determined to be Medium/High, High/High, and High/Medium. In an example, in Green and Yellow risk situations, the AV can autonomously (i.e., without tele-operator intervention or aid) resolve (e.g., go around, deal with, navigate around, etc.) the obstructions situation. However, when the risk is Red, the AV (i.e., the obstruction manager module 406) initiates a request for assistance from a tele-operator.

Figure 5:
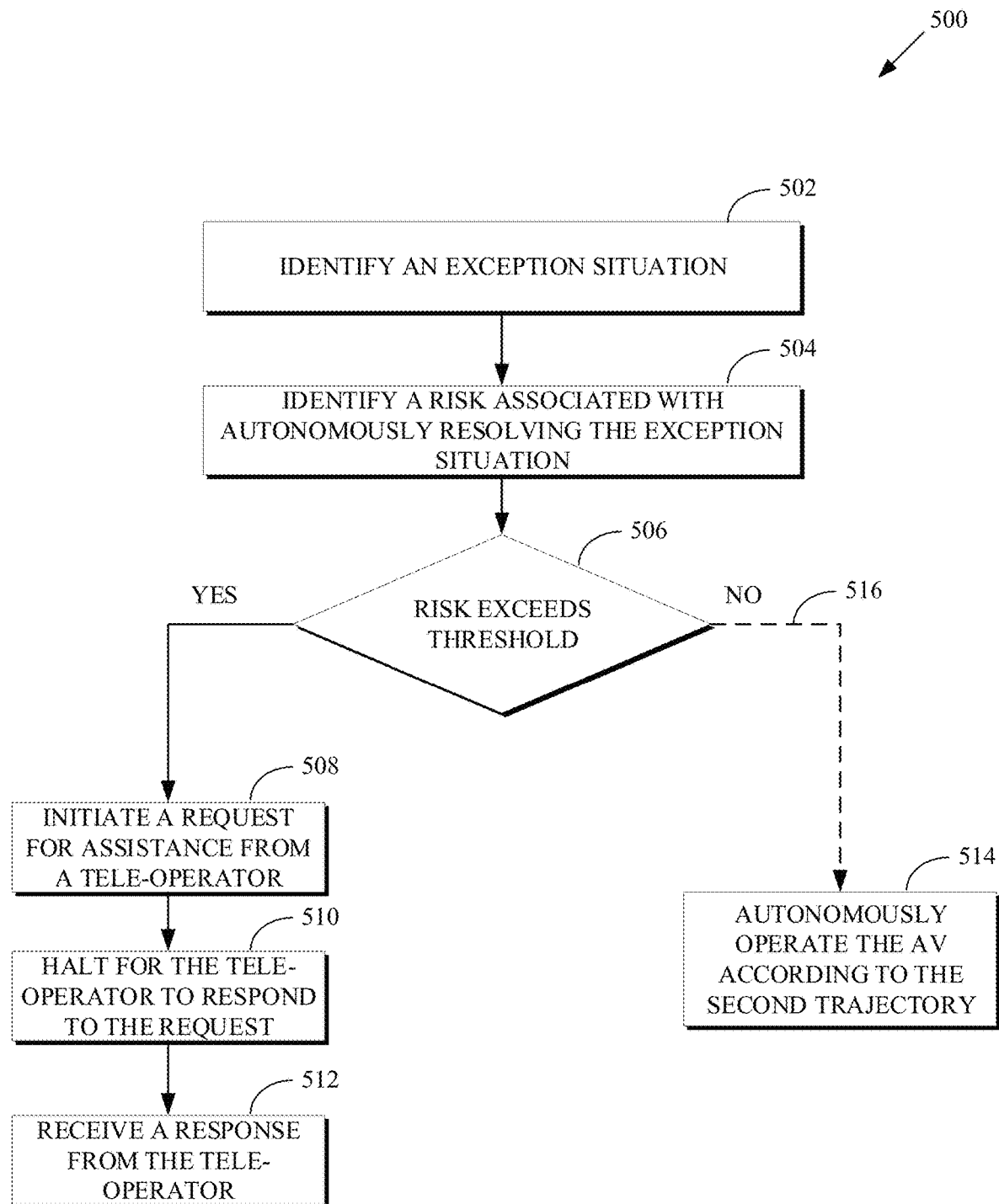
FIG. 5 is a flow chart of a technique for exception handling by an autonomous vehicle according to implementations of this disclosure.

FIG. 5 is a flow chart of a technique 500 for exception handling by an autonomous vehicle (AV) according to implementations of this disclosure. Some or all of the technique 500 for exception handling may be implemented in a vehicle (e.g., an autonomous vehicle) including the vehicle 1050 shown in FIG. 1, the vehicle 2100 shown in FIG. 2, one of the vehicles 340/350/360/370 of FIG. 3, or a computing apparatus including a controller apparatus such as the controller apparatus 2410 shown in FIG. 2. The controller apparatus can include an exception handling module (such as the system 400 of FIG. 4) or the controller apparatus can comprise an exception handling module. In an implementation, some or all aspects of the technique 500 for exception handling can be implemented in a system combining some or all of the features described in this disclosure. The technique 500 can be executed, partially or fully, by at least some of the modules of the system 400 of FIG. 4.

At 502, the technique 500 identifies an exception situation. In an implementation, identifying an exception situation can include identifying an obstruction of a first trajectory of the AV, determining a second trajectory that avoids the obstruction, and determining that the second trajectory violates a driving norm.

Figure 6A:
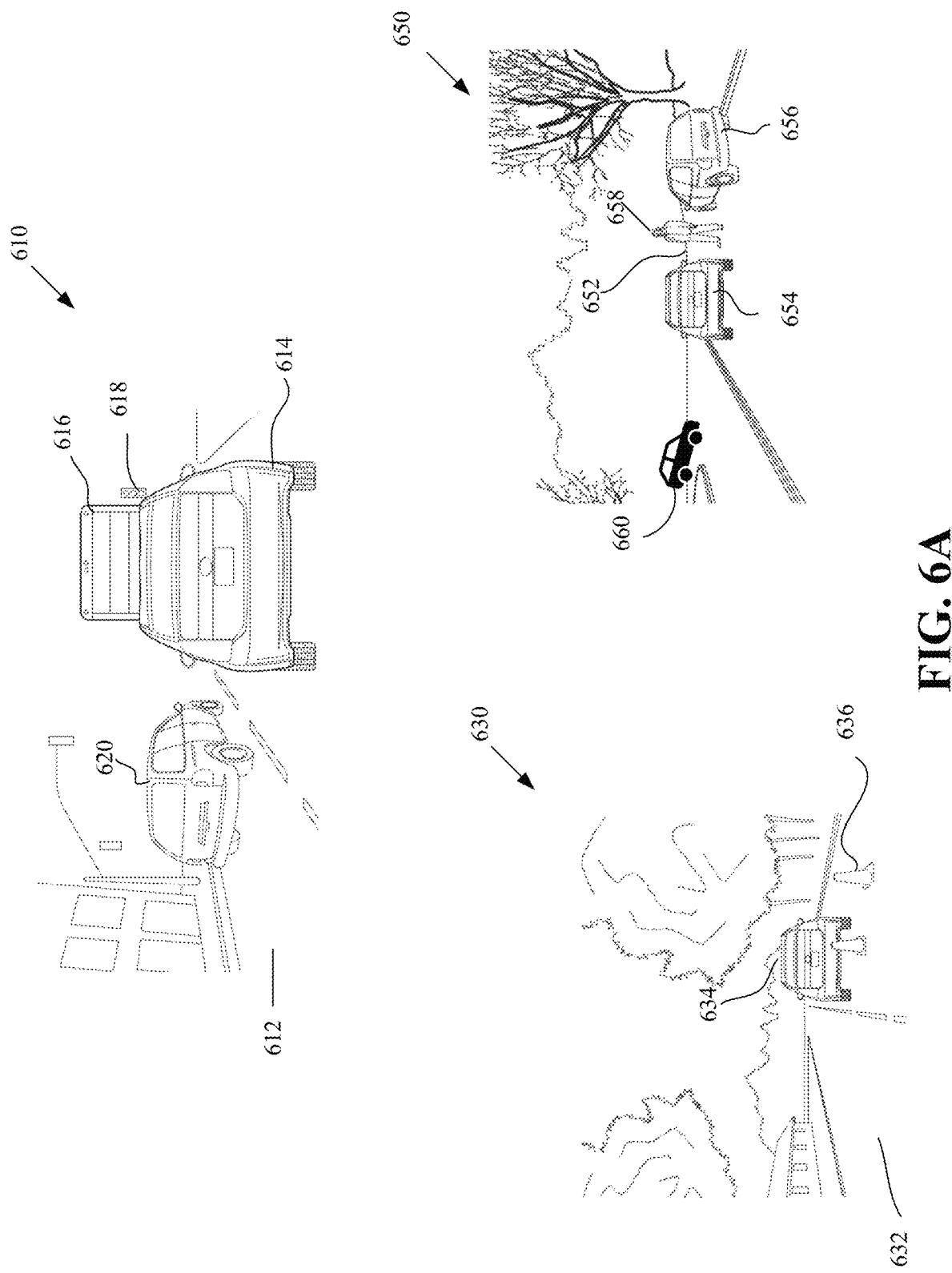
FIGS. 6A-6B are block diagrams illustrating examples of obstruction situations according to implementations of this disclosure.
Figure 6B:
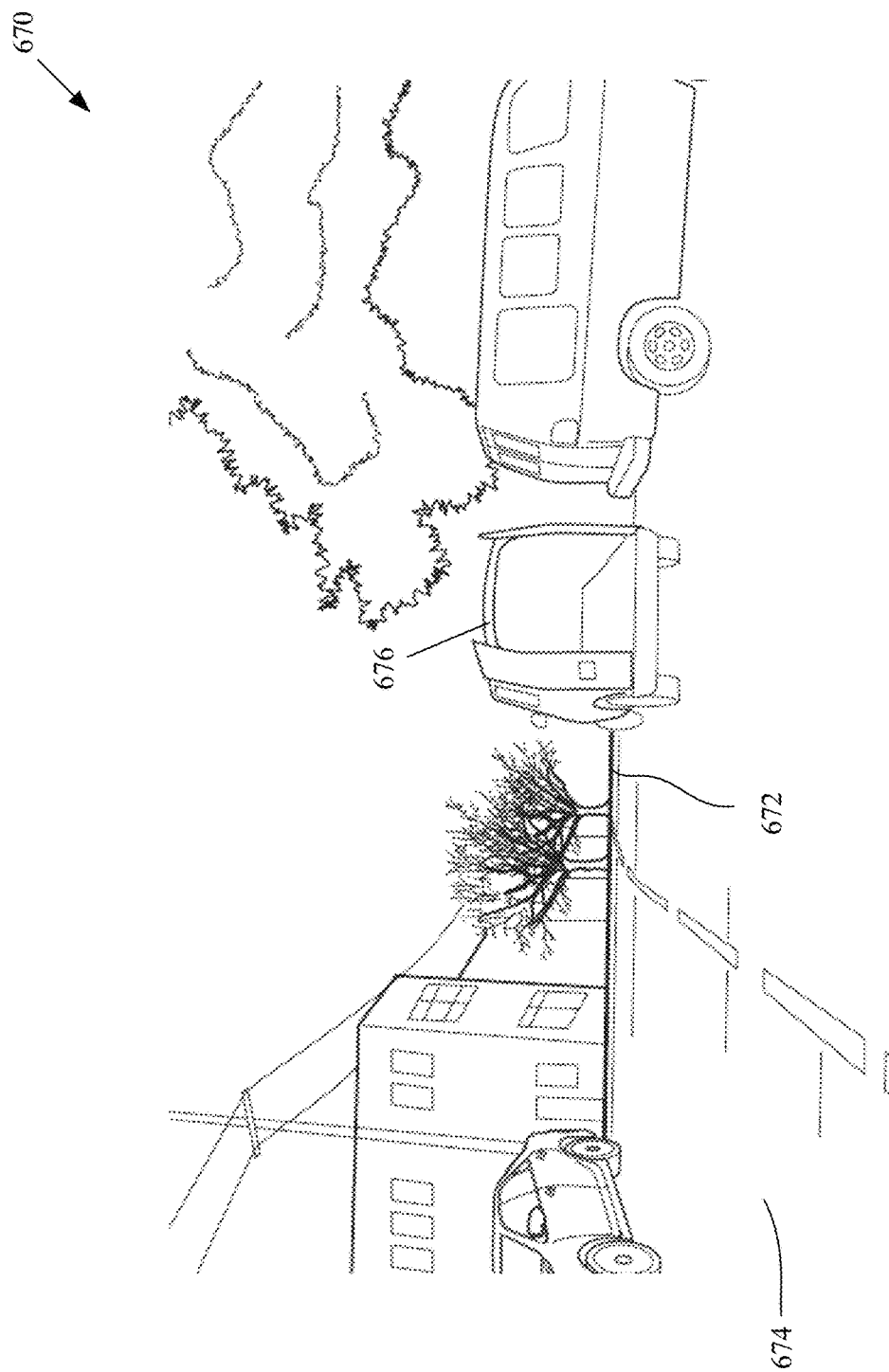

FIGS. 6A-6B are block diagrams illustrating examples of obstruction situations 610, 630, 650, 670 according to implementations of this disclosure. The obstructions situations 610, 630, 650 are depicted from a point of view of, for example, a front facing camera and/or sensors of an AV (not shown). That is, in each of the obstruction situations 610, 630, 650, the illustrated example depicts the view (e.g., the obstruction scene) as perceived through one or more sensors of the AV.

In the obstruction situation 610, the AV is depicted in a right lane of a two-lane road, including a left lane 612. The AV is stopped behind a vehicle 614, which in turn is stopped behind a truck 616. The vehicle 614, the truck 616, and any other road users described with respect to any other figure(s) can be maintained by a world model module 402 of the AV. The AV can detect the obstruction situation based on at least one or more criteria. For example, the obstruction situation can be detected if the path of the AV remains obstructed for more than a predefined period of time.

The predefined period of time can be 1 minute, 2 minutes, or some other predefined period of time. In an example, the predefined period of time may depend on an average traffic signal time that is proximate to the AV. For example, the AV (or a module thereof) may include (or have access to) High Definition (HD) map information that can include traffic signal information. Similarly, the AV can include a global positioning sensor (GPS). As such, using a location of the AV (using the GPS information) and the map information, the AV can determine the average traffic signal time.

In another example, the AV can detect the obstruction situation because a traffic signal 618 has turned green, a vehicle 620 in the left lane 612 is moving forward, some other criteria, or a combination thereof, yet the path of the AV remains obstructed. The HD map information can include accurate information regarding a vehicle transportation network to within a few centimeters. For example, the HD map information can include details regarding road lanes, road dividers, traffic signals, traffic signs, speed limits, and the like.

In an example, a trajectory planning module of the AV, such as the trajectory planning module 404 of FIG. 4, can be used to determine that the path (e.g., trajectory) of the AV is obstructed. For example, the trajectory planning module can determine that if the AV were to continue along its current trajectory, then the AV will encounter (e.g., collide with) a static blockage (i.e., the vehicle 614) within 0.5 seconds. As mentioned above, an instance of the trajectory planning module can be used to determine a trajectory for the vehicle 614. If the vehicle 614 has not moved for a certain period of time, then state information in the world model module 402 can indicate that the vehicle 614 is a static object.

The obstruction situation 630 illustrates the AV as traveling on a one-lane road where a lane 632 is for the opposite direction traffic. A vehicle 634 is stopped. State information of the vehicle 634 (such as state information that can be maintained by a world model module, such as the world model module 402 of FIG. 4) can indicate that the vehicle 634 is stopped. In some examples, the AV (such as via sensors of the AV) can determine that the hazard lights of the vehicle 634 are flashing. In some examples, the AV can detect that pylons 636 are placed behind the vehicle 634.

The obstruction situation 650 illustrates that the AV is approaching an intersection 652. The AV can identify the intersection based on map information that can be available to the AV. A vehicle 654 and a vehicle 656 are stopped. However, an obstruction module of the AV, such as the obstruction manager module 406 of FIG. 4, may not be able to determine with certainty whether at least one of the vehicles 654, 656 is stopped at the intersection or stopped for some other reason. A pedestrian 658, and a vehicle 660 are also detected in the scene. As mentioned, the world model module 402 of the AV can maintain state information associated with each of the vehicles 654, 656, 660 and the pedestrian 658.

The obstruction situation 670 illustrates that the AV is approaching an intersection 672. The intersection 672 is at the top of a hill. As such, sensors of the AV cannot observe other world objects that may be on the other side of the hill in an opposite-direction lane 674. A vehicle 676 is stopped. The vehicle 676 is obstructing the path of the AV. In some examples, the AV may be able to detect that the vehicle 676 is a van. An obstruction module of the AV, such as the obstruction manager module 406 of FIG. 4, can identify the vehicle 676 as loading/unloading because the backdoors of the vehicle 676 are opened.

As mentioned above, the AV can determine a trajectory that avoids (e.g., navigates around) the obstruction. In an example, a trajectory planning module, such as the trajectory planning module 404 of FIG. 4, can be used to determine one or more trajectories for navigating around the obstruction. The obstruction module can instruct the trajectory planning module to generate trajectories such that operating the AV according to the trajectories would violate traffic norms.

With respect to the obstruction situation 610, the AV can determine a trajectory whereby the AV uses the left lane 612. The direction of traffic of the left lane 612 is the same as that of the AV. As such, by moving to the left lane 612, the AV does not violate any traffic norms. In another example, the AV can decide to continue stopping behind the vehicle 614 (for example, because the left lane 612 is not clear). In such a situation (e.g., continuing to stop behind the vehicle 614), traffic norms are also not violated. Because no traffic norms are violated, the AV can classify the obstruction situation 610 as a normal obstruction situation.

On the other hand, the obstruction situations 630, 650, 670 are classified as exception situations because, to get around the obstruction, the AV would have to cross the center line of the road and travel on an opposite-traffic lane (e.g., the lane 632 or the opposite-direction lane 674).

At 504 of FIG. 5, the technique 500 identifies a risk associated with the exception situation. That is, the technique 500 identifies a risk associated with autonomously resolving the exception situation, such as resolving the exception situation without human (e.g., a tele-operator) supervision. Said another way, the technique 500 can identify the risk associated with a determined trajectory for navigating around the obstruction. In an example, the risk can be identified by a risk evaluation module, such as the risk evaluation module 408 of FIG. 4. In an example, the risk can be considered to be a measure of understanding by the AV. In another example, the risk can be based on a weighting of the understanding by the AV of the obstruction scene and the consequences of following the second trajectory that avoids the obstruction.

With respect to the obstruction situation 630 of FIG. 6A, the risk associated of autonomously navigating around the obstruction are not high. However, since navigating around the obstruction requires violating traffic norms (e.g., traveling on the lane 632), the risk is a medium ("Yellow," per Table I) risk. The lane 632 is an oncoming (i.e., opposite-direction) traffic lane. In an example, driving in the lane of oncoming traffic can be considered of at least a medium (e.g., yellow) risk.

The vehicle 634 is most likely permanently stopped because other indicia (e.g., the pylons 636 or flashing lights) in the scene indicate so. As such the risk associated with suspending the traffic norms are not high. The risk is a medium risk (e.g., "Yellow," per Table I). However, even if it cannot be determined with high certainty whether the vehicle 634 is permanently stopped, the risk is still not high because the sensors of the AV can perceive (e.g., see) far ahead.

The consequences of misclassifying the vehicle 634 as permanently stopped are also not high. For example, if the vehicle 634 starts to move while the AV is in the process of operating the second trajectory that avoids the obstruction, thereby overtaking the vehicle 634, then the technique 500 would have to determine whether to accelerate the AV further to completely overtake the vehicle 634 or slow down the AV to allow the vehicle 634 to pass ahead of the AV. In either situation, the consequence has low severity because there is ample road ahead (i.e., a clear view ahead).

With respect to the obstruction situation 650 of FIG. 6A, the risk is high (e.g., "Red," per Table I). This is so because it cannot be determined whether the vehicles 654 and 656 are yielding to something in front of them. Additionally, HD map data can indicate the presence of the intersection 652. As such, the vehicles 654 and 656 could be legitimately stopped for some other reason; namely, the vehicles 654 and 656 could be yielding at the intersection. The risk is also high because a person (i.e., the pedestrian 658) is detected in the scene. The risk can be considered high at least because i) the person may not be behaving as a typical pedestrian may be expected to and/or ii) the vehicles 654 and 656 may be legitimately stopped at the STOP intersection ahead. For example, instead steadily walking from one side of the road to the other, the person may be almost stationary.

Additionally, the identity (e.g., role) of the pedestrian 658 may not be determinable with certainty. For example, the pedestrian 658 may be a motorist that has stopped to talk to another motorist. If this is the situation, the risk may be lower than if the pedestrian 658 were classified as a traffic controller or a policeman. In an example, the risk can be set to high (e.g., "Red," per Table I) whenever pedestrians (e.g., humans) are detected in the scene.

With respect to the obstruction situation 670, the risk is high (e.g., "Red," per Table I) because to navigate around the obstruction, the AV would have to travel on the opposite-direction lane 674 but with an obstructed view of what is on the other side of the hill. The risk (e.g., the risk of passing) can be determined to be high because the vehicle 676 may be yielding to another road user at a STOP intersection.

At 506, the technique 500 determines whether the risk exceeds a threshold. If the risk does exceed the threshold, then the technique 500 proceeds to 508. In an implementation, and as illustrated by a dashed line 516, if the risk does not exceed the threshold, the technique 500 can proceed to 514.

The threshold can be such that it can be compared to the risk. For example, if the risk is a percentage, then the threshold can also be specified as (or can be converted to) a percentage (e.g., 60%, 70%, or some other percentage). For example, if the risk is an ordinal value, then the threshold can be (or can be converted to) one of the ordinal values. For example, if the risk can be, in increasing severity, one of the values "low"/"green" "medium"/"yellow," or "high"/"red" then the threshold may be "medium"/"yellow." As such, if the risk is determined to be "high"/"red" and the threshold is selected to be "medium"/"yellow," then the technique 500 proceeds to 508. In an example, the risk can correspond to a classification. For example, the obstruction situation can be classified into one of the classes normal, low, high or some other classification.

At 508, the technique 500 initiates a request for assistance from a tele-operator. Initiating the request can include initiating a request for assistance to one of more remote vehicle assistance centers, such as the remote vehicle assistance center 300 of FIG. 3. As such, a tele-operator, such as one of the tele-operators 320, 330 of FIG. 3 can respond to the request. The request can be transmitted via an electronic communication interface, such as the electronic communication interface 1370 of FIG. 1. At 510, while the technique 500 waits for instructions from a tele-operator, the technique 500 causes the AV to halt (e.g., wait) in place behind the obstruction. That is, the AV safely halts and waits for the tele-operator to respond, if the tele-operator has not done so already.

The request can include information (e.g., state data) that can be useful to a tele-operator in responding to the request. The information can be included in the request when the request is initiated. In some examples, at least some of the information can be transmitted by the technique 500 in response to a request for that information from one or more systems used by a tele-operator. As such, some of the information may be pushed to a system of the tele-operator. Whether information is pushed from or pulled from the vehicle, such information is collectively referred to as transmitted information.

The state data can include, but is not limited to, data that indicates the state or condition of the vehicle that is executing the technique 500, including any of kinetic state data relating to any of the velocity and acceleration of a vehicle, location data, including the geographical location of a vehicle (e.g., the latitude and longitude of the vehicle) or the location of the vehicle with respect to another object, vehicle position, including the orientation and inclination (e.g., slope of the vehicle on an incline) of the vehicle, the operational state of the vehicle, including the electrical state or mechanical state of the vehicle (e.g., health of the electrical vehicle systems, mechanical vehicle systems, tire pressure, etc.), maintenance data related to maintenance of the vehicle, energy source data including an amount of fuel remaining or an amount of battery charge remaining, sensor data based on outputs from sensors including, optical sensors, audio sensors, an motion sensors, internal state data, including a temperature and humidity inside the passenger cabin of the vehicle, and a current task (e.g., pick up a passenger) of the vehicle.

The transmitted information can also include state information of other road users that are maintained in a world model module, such as the world model module 402 of FIG. 4. For example, state of an object that is, or is a part of, the obstruction, and/or the state of other objects proximal to the vehicle can be included in the transmitted information. For example, zero or more of a velocity, a pose, a geometry (such as width, height, and depth), a classification (e.g., bicycle, large truck, pedestrian, road sign, etc.), a location, other information, or a subset thereof can be transmitted from the vehicle so that the tele-operator can have sufficient information to determine a response.

Figure 7:
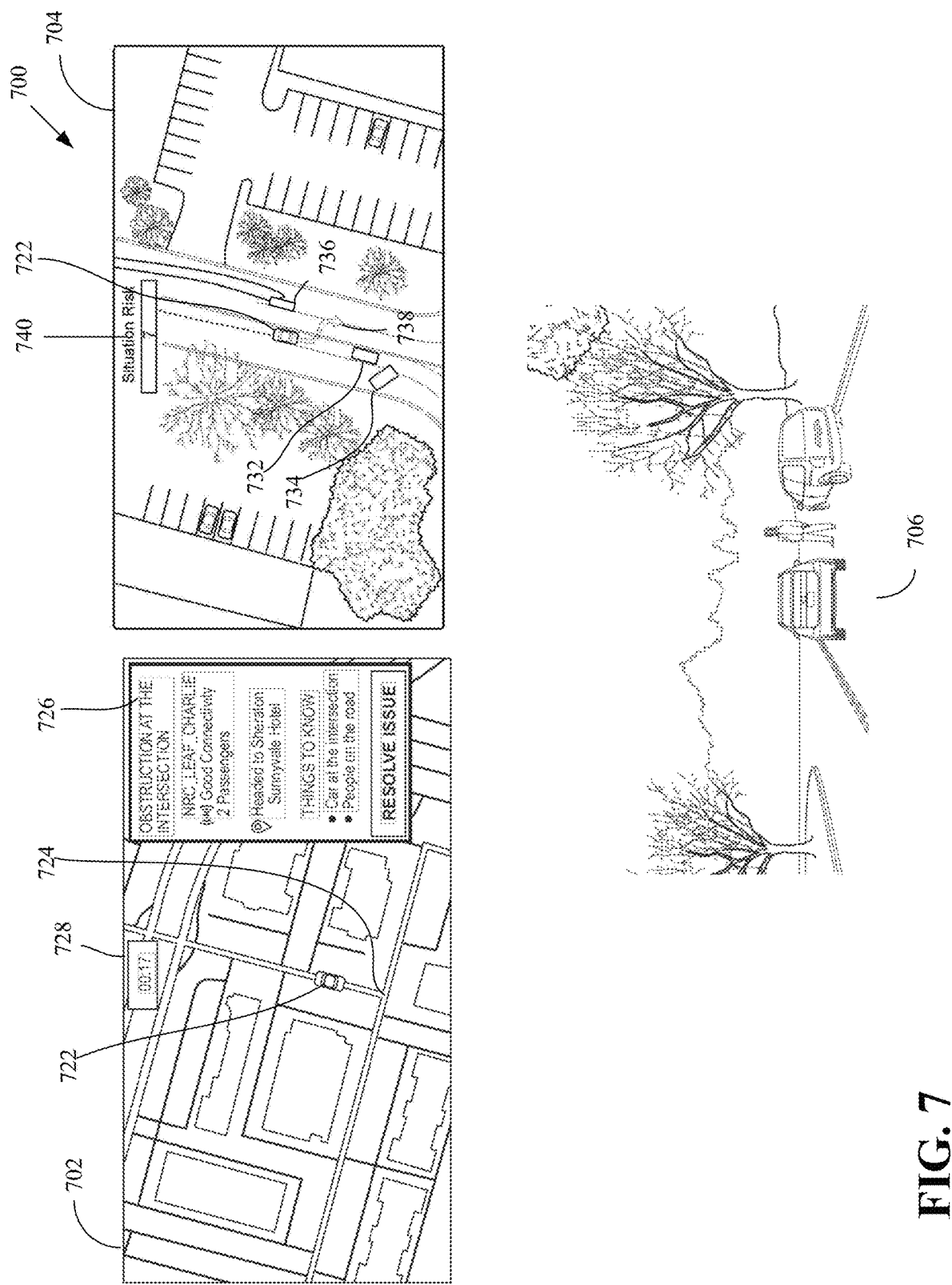
FIG. 7 is an illustration of user interfaces 700 of a tele-operator according to implementations of this disclosure.

FIG. 7 is an illustration of user interfaces 700 of a tele-operator according to implementations of this disclosure. The user interfaces 700 are mere illustrative examples of visual information that a tele-operator may need in order to respond to the request. One or more of the user interfaces 700 can be displayed (or available for display) to a tele-operator. The user interfaces 700 include a map view 702, an augmented view 704, and a dashcam view 706. However, the user interfaces 700 can include more, fewer, or other user interfaces and/or information that can aid the tele-operator in responding to the received request.

The map view 702 depicts one or more vehicles that are managed by the tele-operation center. The one or more vehicles are overlaid on a street map. The map view 702 illustrates that the vehicle 722 is approaching an intersection 724. The map view 702 can be generated using location information that is received from the vehicle 722. That is, the vehicle 722 can regularly (e.g., every several milliseconds) send its location information to a system that enables the creation of the view 704. The map view 702 illustrates a ticket view 726, which is further described with respect to FIG. 8. A timer 728 can indicate how long the vehicle 722 has been stopped.

The augmented view 704 illustrates a satellite view of empty streets overlaid with the vehicle 722 and other road users. The other road users include any road users that constitute the obstruction and/or other proximal road users. The state information transmitted by technique 500 can be used to generate the augmented view 704. For example, pose and size state information of the other road users can be used to create the augmented view 704. A vehicle 732, a vehicle 734, and a vehicle 736 are augmented information that correspond, respectively, to the vehicles 654, 654, and 660 of FIG. 6A. As the augmented view 704 is generated at a different point in time than that of the obstruction situation 650, the different road users have different poses, locations, and orientations. That is, the augmented view 704 can be an up-to-date (e.g., near real-time) view of the obstruction situation.

As mentioned above, the technique 500 can determine a second trajectory that avoids the obstruction. The second trajectory can be transmitted in the request to the tele-operations center. In such a case, the augmented view 704 can include a trajectory indicator 738 that illustrates the second trajectory. The second trajectory can be transmitted in the form of a series of locations, which are connected in the augmented view 704 as the trajectory indicator 738. The augmented view 704 can also include an indicator (i.e., a risk indicator 740) of the risk as identified by the technique 500. The risk indicator 740 illustrates that the technique 500 determined the risk to be 7 (e.g., 7 out of a maximum risk of 10). The risk as identified by the technique 500 can be included in the transmitted information.

In an example, the technique 500 can transmit (e.g., in near real-time) one or more dashcam images. That is, the vehicle may be equipped with a camera that is directed towards the front of the vehicle such that the camera can capture images of the obstruction scene. In some examples, the camera can be a video camera. The dashcam view(s) may be displayed to the tele-operator as the dashcam view 706.

Figure 8:
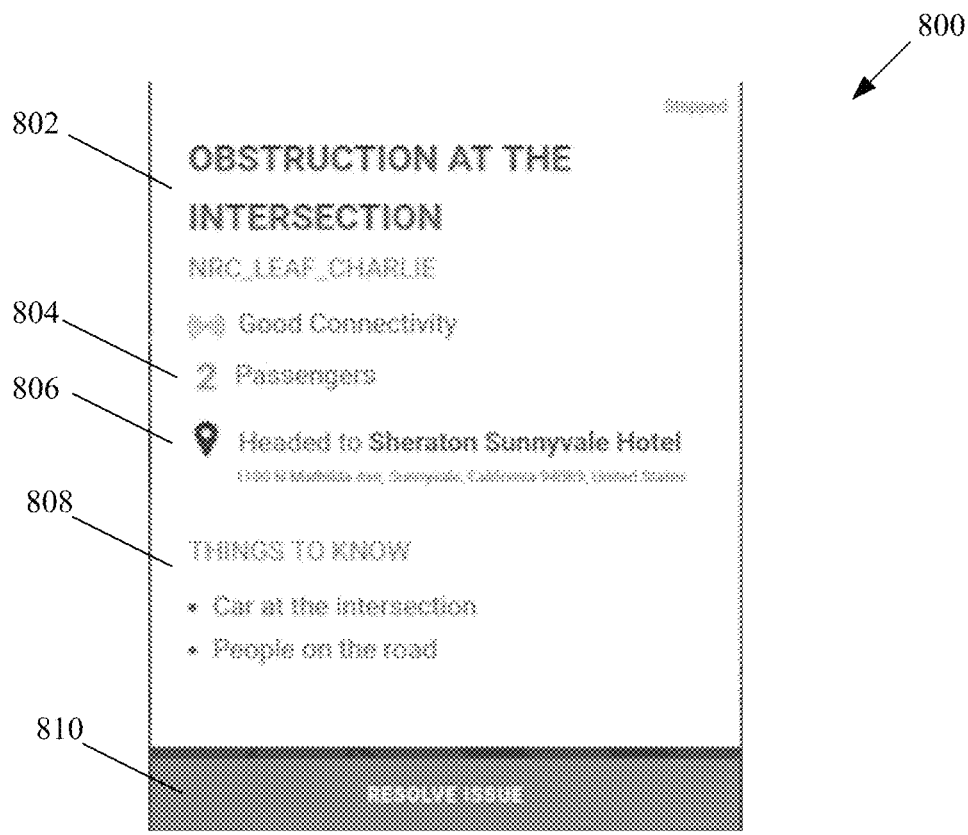
FIG. 8 is an illustration of a ticket according to implementations of this disclosure.

FIG. 8 is an illustration of a ticket 800 according to implementations of this disclosure. The ticket 800 illustrates an example of what may be presented to a tele-operator at a tele-operations center in response to an AV initiating a request for tele-operator assistance. The ticket 800 includes an exception description 802, occupancy information 804, destination information 806, feature information 808, and an action button 810. In some implementations, more, fewer, other information or actions, or a combination thereof can be displayed in the ticket.

The exception description 802 can be a summary of the nature (e.g., type) of the exception situation. For example, with respect to the obstruction situation 670 of FIG. 6B, the exception description 802 can be "VIEW OF INCOMING TRAFFIC OBSTRUCTED BY HILL." The occupancy information 804 can describe whether there are any, and/or the number of, passengers in the AV. For example, the AV may be executing a robo-taxi (i.e., autonomous taxi) service at the time of the occurrence of the exception situation. As such, there would be passengers in the AV. In another example, the AV may be on its way to a service and maintenance center following passenger drop off. As such, no passengers may be in the AV. To what extent the AV may be allowed to suspend (e.g., disobey, deviate from) traffic norms in order to circumvent the obstruction may depend on whether passengers are in the AV.

The destination information 806 can indicate the next destination of the AV. Alternatively or additionally, the destination information 806 can indicate a final destination of the AV. For example, the AV may be scheduled to make stops along a route to a final destination. As such, any of locations of the stops and/or the final destination can be listed in the destination information 806.

The feature information 808 can include values of features that are important and/or relevant to resolving the exception situation. As mentioned above, the features can include whether any other world objects are present in the scene, the location of the AV on an HD map, the speed of the AV, the visibility from the AV, specific features regarding stopped vehicles, fewer information, additional information, or a combination thereof. For example, features regarding other world objects can include whether there are any of vehicles, bicycles, pedestrians and their respective numbers. The location of the AV on the HD map can include the type of road, the presence of traffic signs (e.g., traffic lights, stop signs, etc.), intersections, and the like. The visibility from the AV can include whether the view of the AV is blocked by a stopped vehicle, the presence of a hill, and the like. Other features regarding stopped vehicles can include whether hazard lights are on, whether and which doors are open, whether pedestrians are loading or unloading, and the like.

A tele-operator can select (e.g., click, activate, press, etc.) the action button 810 when the tele-operator is ready to resolve the ticket. When the action button 810 is selected, the tele-operator can evaluate the obstruction situation, such as by observing, in real time (or near real time) the augmented view 704, the dashcam view 706, or any other views. The tele-operator can also evaluate the trajectory indicator 738. The tele-operator can be presented with a menu, as described with respect to FIG. 9, for selecting a response.

Figure 9:
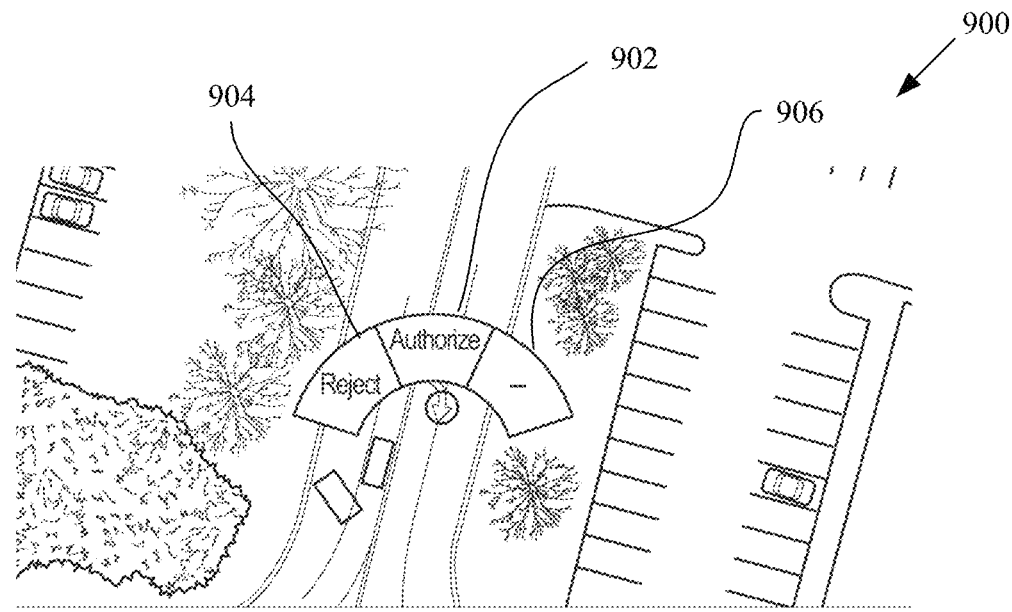
FIG. 9 is an illustration of menu of responses of a tele-operator according to implementations of this disclosure.

FIG. 9 is an illustration of menu 900 of responses of a tele-operator according to implementations of this disclosure. In an implementation, the menu 900 can be displayed in the augmented view 704 proximal to the trajectory indicator 738. For example, the menu 900 can overlay the trajectory indicator 738 in response to the tele-operator clicking on or proximal to the trajectory indicator 738. The menu 900 includes three options, each option corresponding to a response of the tele-operator. However, more, fewer, or other response options may be possible. By selection a menu option from the menu 900, the tele-operator causes instruction data to be transmitted to the AV. The instruction data can be transmitted through a network including a wireless network (e.g., cellular network) or any other communication link, system, or platform between the remote support system and the vehicle being monitored/supported, such as described with respect to FIG. 2.

The instruction data can include but is not limited to instructions to be performed by the AV or an occupant of the vehicle (e.g., a driver, a passenger). The instruction data can include data associated with any of controlling movement of a vehicle, including changing the acceleration, velocity, or direction (e.g., steering), of the vehicle, activating or deactivating (e.g., turning some or all parts of the vehicle on or off) a control system in the vehicle, including mechanical control systems and electrical control systems, activating or deactivating sensors in the vehicle (e.g., activating a camera to view the interior of the vehicle or an area outside the vehicle), activating or deactivating a communication system including any of internal communication systems (e.g., internal speakers directed at vehicle occupants) and external communication systems (e.g., external speakers directed at objects or individuals outside of the vehicle).

In an implementation, transmitting the instruction data to the AV can include transmitting driving route data (i.e., a third trajectory) for implementation by an autonomous device or system of the vehicle. The third trajectory can be a short-term path around an obstruction situation. The third trajectory can be a new route to a destination such that the new route circumvents the obstruction situation. As such, the driving route data can include instructions to modify an existing driving route for the vehicle.

In another implementation, transmitting the instruction data to an autonomous vehicle can be associated with ignoring at least one operating constraint of the autonomous operation to allow the first vehicle to traverse the driving route. As an example, autonomous operation of a vehicle can include operating constraints that prohibit certain types of actions by the vehicle, including any of violating a speed limit, including driving too rapidly or driving too slowly, violating a traffic regulation, including driving in the opposite direction of traffic, and driving away from a road surface. By ignoring an operating constraint, a vehicle is able to perform prohibited actions in accordance with instructions in the instruction data. For example, circumventing a construction zone could include driving in a portion of the roadway that was previously restricted such as when the portion of the roadway isn't a paved road surface and is instead a dirt road.

By selecting a menu option 902 (i.e., "Authorize"), the tele-operator authorizes to AV to proceed along the second trajectory that is proposed by the AV. That is, the technique 500 receives a response to proceed. By selecting a menu option 904 (i.e., "Reject"), the tele-operator instructs the AV to continue to wait (e.g., halt in place to await further instructions). That is, the technique 500 receives a response to wait. By selecting a menu option 906, the tele-operator can select (e.g., draw, define, etc.) a new route (i.e., a third trajectory) to be followed by the AV.

Referring again to FIG. 5, at 512, the technique 500 receives a response (i.e., a received response) from the tele-operator. As already mentioned, the response can be one of a first response to wait, a second response to proceed, or a third response that includes a trajectory.

The technique 500 can further include, in response to the response being a proceed response, operating the AV according to the second trajectory. For example, the tele-operator can authorize (such as by selecting the menu option 902 as described with respect to FIG. 9) the second trajectory, which is indicated by the trajectory indicator 738 of FIG. 7. As such, the technique 500 can operate or cause the AV to be operated according to the trajectory indicator 738. The technique 500 can further include that, in the case that the response is a response that includes a trajectory, such as a third trajectory, the technique 500 can operate, or cause the AV to be operated, according to the third trajectory.

At 514, that is, in response to the risk not exceeding the risk threshold, the technique 500 operates the AV according to the second trajectory.

In an implementation, the technique 500 can include revoking the request to the tele-operator. For example, while the technique 500 is halting at 510, the obstruction may clear. Referring to the obstruction situation 650 of FIG. 6A, while the AV is halting, the vehicle 654 proceeds forward and the pedestrian 658 exists the scene (such as by entering the vehicle 656). The technique 500 may determine (such as using a trajectory planning module) that there is enough clearance in the road to pass by the vehicle 656 and that the path of the AV is no longer obstructed. As such, the AV can proceed normally. Therefore, tele-operator assistance is no longer required. As such, in response to determining that the exception situation is cleared, the technique 500 can revoke (e.g., cancel, withdraw, etc.) the request to the tele-operator. In another example, even if the obstruction clears, the AV continues to halt until the technique 500 receives a response to the request. That is, the technique 500 cannot revoke the ticket.

Figure 10:
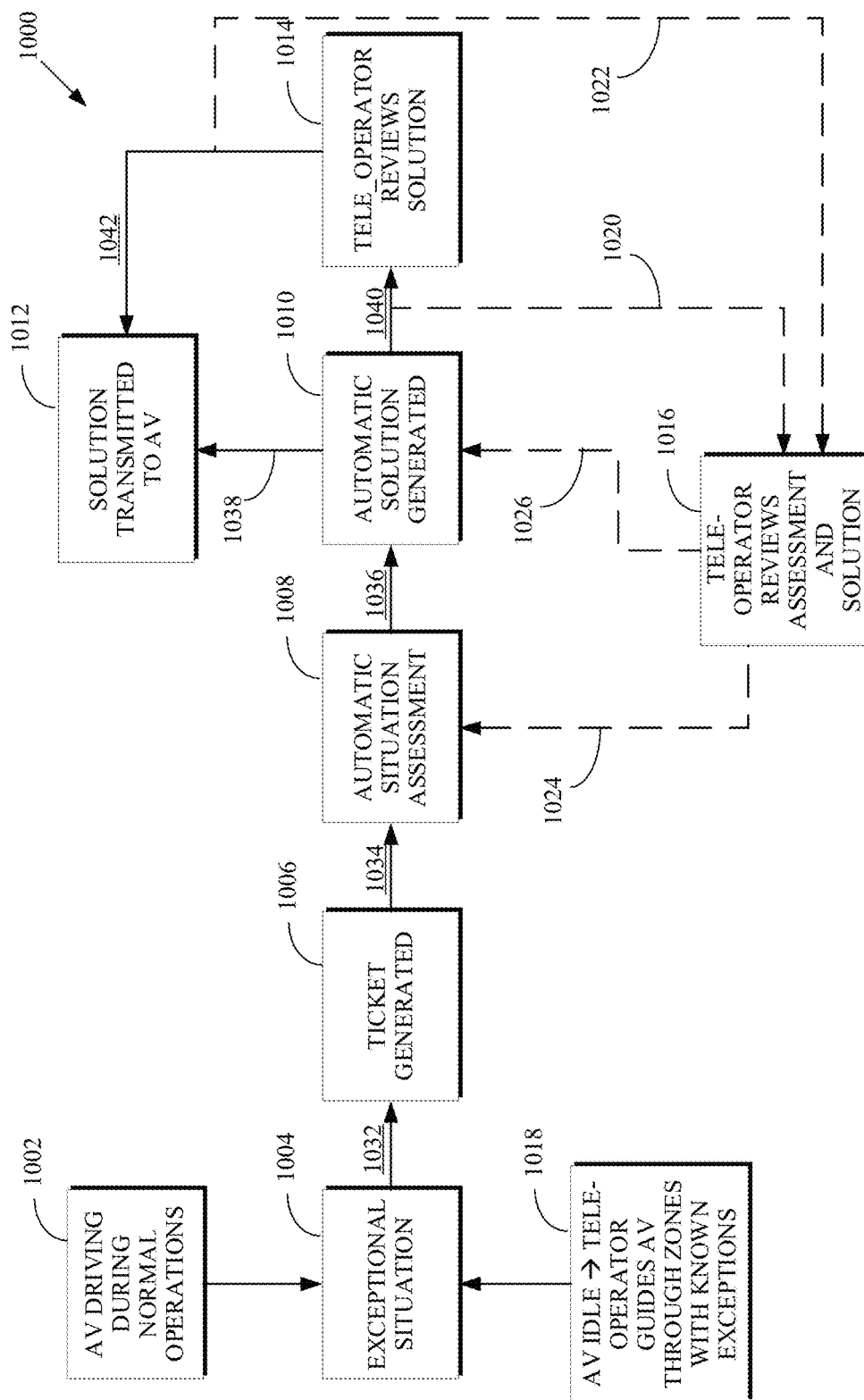
FIG. 10 is a flow chart of a technique for exception handling by an autonomous system according to an implementation of this disclosure.

FIG. 10 is a flow chart of a technique 1000 for exception handling by an autonomous system according to an implementation of this disclosure. Some or all of the technique 1000 for exception handling may be implemented in an autonomous system. The autonomous system can be a system that is remote to, and/or accessible by, a vehicle, such as an autonomous vehicle. In an example, the autonomous system can include the modules, or modules similar to those, described with respect to FIG. 4. The autonomous system can be executed at, or can be accessible to, a remote vehicle assistance center, such as the remote vehicle assistance center 300 of FIG. 3. The technique 1000 receive a request for assistance from a vehicle, such as an AV. For example, the request for assistance can be initiated by the AV in response to the AV encountering an exception situation. At least some of the blocks of the technique 1000 can be stored in a memory as executable instructions and executed by a processor. In an example, one or more of the steps of the technique 1000 can be executed by the controller apparatus 2410.

At 1002, the AV can be driving (or more generally, operating) in normal operations. At 1004, the AV may encounter an exception situation. As an example, the exception situation can be an obstruction situation. In an example, the AV can initiate a request for assistance such as described with respect to the technique 500 of FIG. 5. That is, for example, if the risk associated with autonomously resolving the exception situation exceeds a risk threshold, then the AV can initiate a request to the autonomous system, as indicated by a path 1032. In another example, the information (such as telemetry information) from the AV can be transmitted along with the request. The raw telemetry data, features and feature values as identified by the AV from the telemetry data, or a combination thereof can be transmitted. Collectively, any information received from the AV is referred to herein as received information.

At 1006, the technique 1000 can generate a ticket. The ticket can be represented by a data structure in the autonomous system. In an example, tickets can be processed by the autonomous system in a first-in-first-out order. In another example, a priority (e.g., severity) may be associated with a ticket and tickets can be processed based on the associated priorities.

At 1008, the technique 1000 can perform an automatic situation assessment using the ticket, the received information, other information, or a combination thereof. Situation assessment can include extracting features and feature values for the exception situation. The technique 1000 can extract features and feature values from the received information. For example, in order to assess the situation, the autonomous system can be configured to determine whether certain features are present in the situation (i.e., in the scene of the situation) and what are the values of those features. The features to be assessed can be pre-configured. In an example, the type (e.g., class) of the exception situation can be determined. Based on the type of the exception situation, corresponding pre-configured feature can be identified by the technique 1000.

Examples of features and feature values are described above. For example, with respect to the obstruction situation 670 of FIG. 6B, and using information (e.g., one or more images) from a front-facing camera of the AV, the technique 1000 can identify at least that a big vehicle (i.e., the vehicle 676 of FIG. 3B) and that the big vehicle is stopped; the technique 1000 can identify that one door of the big vehicle is open and that there are no people present around this vehicle. As mentioned above, the autonomous system can identify, with respect to a feature that may labeled "road type" whether the AV is currently located on a highway or a slow road. For example, with respect to the obstruction situation 650 of FIG. 6A, the autonomous system can identify at least that a feature labeled "persons present" has a value of "1;" that a feature labeled "traffic signs" has a value of "stop sign" and an associated "distance" of "20 feet."

As mentioned above, the feature values can additionally be determined using information other than the information received from the AV. For example, that a "stop sign" exists 20 feet from the AV can be determined using HD map information in combination with the GPS location of the AV. For example, it may be identified that the vehicle 656 of FIG. 6A has been stopped for 15 minutes and that the vehicle 654 of FIG. 6A has been stopped for 5 minutes. Such information can be identified using information received by the autonomous system from other vehicles that passed by the location of the obstruction situation 650 within 20 minutes of the AV. Additional information that can be used by the technique 1000 to identify (e.g., determine, calculate, infer, etc.) features and feature values can include traffic density and/or knowledge of construction zones. The feature and features values may be stored, such as in a memory, in a non-intelligible format. However, as the features and the feature values may need to be used by a tele-operator, as further described below, the technique 100 can convert the features and the feature values to equivalent human readable representations.

At 1010, the technique 1000 generates an automatic solution. The technique 1000 receives, along a path 1036, the features and feature values and/or at least a subset of the raw telemetry data, which can be used in the generation of the automatic solution. For example, in the case that the exception situation is an obstruction situation, the automatic solution can be generated as described above with respect to an AV determining a trajectory for navigating around the obstruction. However, as already described, the technique 1000 can use additional information (including responses from a tele-operator) in generating the automatic solution than is available to the AV in determining the trajectory for navigating around the obstruction.

In some examples, the technique 1000 may not be able to identify a feature or a feature value based on some of the raw telemetry data. As such, prior to generating the automatic solution, the technique 1000 can prompt a tele-operator with one or more questions. For example, the technique 1000 can receive sensor data (such as a LiDAR point cloud or a camera image) from which the technique 1000 cannot identify a feature. As features and/or feature values corresponding to these sensor data may be important (for example, based on the type of the exception situation) in the automatic solution generation. As such, the tele-operator can be prompted to identify a feature (e.g., an object) and/or a feature value. As such, the response of the tele-operator can also be used to teach the technique 1000 how to recognize the same or similar features and/or feature values in the future. In an example, a bounding box around an unrecognized object (e.g., around the LiDAR cloud) may be presented in a user interface to the tele-operator and, via the user interface, the tele-operator can provide an identification of the object. For example, the technique 1000 may not have been trained to recognize oversized trucks, yet one existed in the scene of an obstruction situation. As such, a tele-operator can identify the object as an oversized truck. The autonomous system can then be trained to automatically recognize oversized trucks.

As another example, the technique 1000 can associate a confidence level with an identified feature or an identified feature value. If the confidence level is below a certain threshold (e.g., 60%, 50%, or some other threshold), then the technique 1000 can prompt the tele-operator to confirm (e.g., validate) or correct the feature or the feature value. For example, the technique 1000 may have identified a person in the scene. However, the technique 1000 may not have accurately (e.g., with sufficient confidence) determined a role of the person. As such the tele-operator can identify the person for the technique 1000 as, for example, a policeman, a construction worker, or the like.

In yet another example, the received data can include one or more images or a video sequence. As such, the tele-operator can identify the instructions of a person in the scene based on, for example, the hand gestures of the person. Such an identification (e.g., of intentions of a person in the scene) may not be possible for the technique 1000.

The technique 1000 can calculate a confidence level for the automatic solution. In the case of an obstruction situation, the confidence level can be as described with respect to the risk associated with autonomously resolving, by an AV, the exception situation. That is, the confidence level can be based on a weighting of the understanding by the technique 1000 of the obstruction scene and the consequences of following the automated solution that avoids the obstruction. In an example, the confidence can be based (or can be additionally based) on whether the technique 1000 has previously resolved similar situations.

In the case of a pick up or a drop off exception situation, or more generally, in the case of driving autonomously on a tele-operation path outside of the HD map (i.e., a path that is not mapped on the HD map), the confidence level can be calculated using prediction scores (e.g., certainty of identification) associated with detected objects around the AV, how well the data from different sensors match (e.g., both the camera and the lidar identified a vehicle in front of the AV, but the camera didn't detect a pedestrian on the left side while the lidar detected the pedestrian), whether a customer is identified next to the planned pick up point, whether the pick up/drop off point is empty, how dangerous the situation is (e.g., how many other world objects, such as cars, trucks, cyclists, pedestrians, children, etc., are in the scene), fewer, more, other object detection criteria, or a combination thereof.

In the case of a left-behind item exception situation, the confidence level can be computed using confidence scores of object detection as described above, a type of the left-behind item, an estimated value (monetary or otherwise) of the item, the cost of the automated solution, how far the customer is from the AV, the next task scheduled for the AV, fewer, more, other criteria, or a combination thereof. In an example of the cost of the automated solution, a benefit of calling the customer back vs. the potential inconvenience to the customer and/or cost to operate the automated solution can be weighed. For example, the cost of the automated solution would be considered to be high if the customer were to be called back when the left-behind item is determined to be a piece of trash. For example, the cost of the automated solution would be considered to be high if the AV were to be sent for maintenance when maintenance is not really needed. For example, if the left-behind item is determined to be a cell phone, a wallet, a ring, a bag, or the like, then the cost of calling back the customer and/or sending the AV to a maintenance center would be considered to be low.

In the example of prohibited behavior, the confidence level can be computed using confidence scores of object detection as described above, the impact of the prohibited behavior on other passengers (if any), the impact of the prohibited behavior on the passenger performing the prohibited behavior, the impact of the prohibited behavior on the AV, a type of the prohibited behavior, a cost of the automated solution, more, fewer, other criteria, or a combination thereof.

For example, with respect to the impact of the prohibited behavior on the AV, the damage, uncleanliness, messiness, etc. caused by the prohibited behavior can be evaluated. For example, with respect to the type of the prohibited behavior, an identification that the prohibited behavior is prohibited by law might be differently scored than a socially unacceptable behavior. A socially unacceptable behavior may be considered to require less of an immediate action than behavior that is prohibited by law. With respect to the cost of the automated solution, considerations can include the impact regarding the passengers and/or the AV uptime (e.g., availability).

While not specifically shown in FIG. 10, depending the confidence level, the technique can proceed either along a path 1038 or a path 1040. That is, if the confidence level is greater than a threshold value, then the technique 1000 can proceed to 1012; otherwise, the technique 1000 can proceed to 1014. In another example, the technique 1000 does not transmit the solution to the AV. Rather, the automatic solution (regardless of whether a confidence level is or isn't calculated) is forwarded to the tele-operator via the path 1040. As such the technique 1000 may not include the path 1038.

At 1012, the technique 1000 can transmit the automatic solution to the AV. The automatic solution can be transmitted as described above.

At 1014, the technique 1000 can forward the automatic solution to a tele-operator for review. In the case of an obstruction situation, the automatic solution can be forwarded (e.g., presented) to the tele-operator as described with respect to FIG. 7. As such, if the confidence level is not greater than the threshold, then the ticket can be submitted to the tele-operator along with at least some of the features and feature values, additional information, the automatic solution. As such, the tele-operator would have a better situation awareness because the tele-operator would be helped by the features that the technique 1000 identified and would have an initial solution (i.e., the automatic solution) to review.

The automatic solution may not be an optimal solution for resolving the exception situation. However, the automatic solution may be used by the tele-operator as a starting point for generating a solution, rather than having to develop a solution from scratch. The tele-operator can review the automatic solution and, if the tele-operator deems necessary, modify it. In some situations, the tele-operator may generate a new solution. The solution that results from the block 1014 is referred to herein as a validated solution. As such, the validated solution can be the automatic solution, a modified automatic solution, or the new solution that is generated by the tele-operator. The validated solution can be transmitted to the AV at 1012, as illustrated by a path 1042. In an example, an interface such as that described with respect to FIG. 9 can be used by the tele-operator to authorize the automatic solution, review the automatic solution, or generate the validated solution.

As mentioned above, it is desirable that the AV receive a solution to the exception situation in as short a time as possible. The consequences of not receiving a timely solution can include that the AV may be stuck on the road thereby impeding other traffic and/or endangering other road users; or that a passenger in the AV may be delayed. As such, the tele-operator has a limited amount of time to assess the exception situation, understand the exception situation, and come up with a good enough solution. As such, the good enough solution may not be as optimal a solution had the tele-operator had more time to assess the automatic solution, modify the automatic solution, or generate a new solution. However, so that the tele-operator's expertise can improve and/or the ability of the technique 1000 to better assess exception situations (such as at 1008) and/or to generate automatic solutions with more confidence for similar exception situation, the technique 1000 can include one or more feedback loops, which can be performed offline (i.e., subsequent to sending a solution to the AV).

At 1016, which is carried out offline, any tele-operator (who may be the tele-operator discussed above with respect to 1014 or some other tele-operator) can review the assessment of the exception situation and/or the generated automatic solution, and provide feedback that can be codified and used to improve the performance of one or more of the automatic situation assessment (i.e., 1008), the automatic solution generation (i.e., 1010), or some other sub-process or block of the technique 1000.

Along a path 1020, an automatic solution that is forwarded to the tele-operator along the path 1040 can be forwarded to 1016. That is, any automatic solutions (or a subset thereof) whose confidence levels are below the automated-solution threshold can be forwarded to a tele-operator for offline review. Similarly, any validated solutions (or a subset thereof) that is transmitted to the AV along the path 1042 can be forwarded to a tele-operator for offline review, along a path 1022.

At 1016, the tele-operator can review the identified features and/or feature values of the exception situation. In an example, a user interface of the scene may be presented to the tele-operator whereby each identified feature and feature value may be highlighted, and the tele-operator prompted to confirm the accuracy of the feature or the feature value. The user interface can be, or can be similar to, the screenshot described with respect to FIG. 11. The feedback from the tele-operator can be used to improve (i.e., via training) the performance of the technique 1000. In an example, the tele-operator may only be prompted to verify features or feature values that were identified with low confidence. In an example, the tele-operator may be prompted to classify objects that were identified but not classified at 1008. In an example, the tele-operator may identify new features that were completely missed (i.e., not identified) by the technique 1000. As already mentioned, the feedback from the tele-operator can be combined into feedback for the automatic situation assessment, 1008, of the technique 1000, as illustrated by a path 1024. The path 1024 is shown as a dashed line to illustrate that it (as well other dashed lines) is part of an offline operation.

With respect to training, the technique 1000 (or components thereof) can be trained on a regular basis. In an example, training sets (e.g., examples) may be accumulated and the training performed daily, weekly, monthly, or at some other training frequency.

In a first case, the technique 1000 may have already been trained to recognize a feature. However, the technique 1000 did not recognize the feature in a particular scene. For example, that a door of a vehicle is open may be a feature that the technique detects (e.g., looks) for during automatic situation assessment, 1008. However, when analyzing the obstruction situation 670, the technique 1000 did not recognize (e.g., identify) that the backdoors of the vehicle 676 are opened. As such, the tele-operator can identify the feature. In an example, the tele-operator may be able to draw a bounding box on a camera image, on the LiDAR points, and/or any other data and identify (e.g., label, associate) the bounded area with the existing feature (e.g., "doors open"). During training, the automatic situation assessment capabilities of the technique 1000 can learn to map what is in the bounding box to the open-door feature. The tele-operator can identify the feature in some other way and the technique 1000 trained accordingly. In a second case, the technique 1000 may not have already been trained to recognize a feature. As such, the tele-operator can add a new feature, provide a label (e.g., a name) for the feature, and associate the scene data to the feature. During training, many data samples, including that of the scene, that include the new feature can be used to train the automatic situation assessment capabilities of the technique 1000 to recognize the new feature.

At 1016, the tele-operator can also provide feedback regarding the automatic solution, which may be received along the path 1020. The tele-operator can also provide feedback regarding the validated solution, which may be received along the path 1022.

In an example, the feedback can be in the form modifying, adding, or removing rules performed by the technique 1000 during automatic solution generation at 1010. The feedback can be used to enhance the automatic solution generation of the technique 1000, as illustrated by a path 1026.

For example, in the case of an obstruction situation, the technique 1000 may have included a codified rule that essentially states: "pass on the left of an obstruction" even in situations where it is possible to pass on the left or the right. However, while reviewing the solution, the tele-operator noticed that a pedestrian was on the left. Therefore, the tele-operator can modify the codified rule such that it states: "if a pedestrian is on the left AND it is possible to pass on the right, then pass on the right."

For example, in the case of a passenger leaving an item behind, the automatic solution generation, at 1008, may include the rule that essentially states: "if an item is left behind, navigate the AV to the closest maintenance facility." However, while reviewing the scene of the exception situation, the tele-operator may have noticed that the passenger is still close to the vehicle. As such, the tele-operator can modify the codified rule such that it essentially states: "if the passenger is within 5 meters of the vehicle, then emit an audible sound and wait for the passenger to return; otherwise or if the passenger does not return within 30 seconds, then navigate the AV to the closest maintenance facility."

For example, in the case of prohibited behavior, the tele-operator can provide one or more solutions such as notifying the passenger, stopping the AV, dispatching a team to the AV, notifying law enforcement, other solutions, or a combination thereof.

For example, in the case of pick up/drop off scenarios, a solution provided by the tele-operator can be a path that the tele-operator draws (e.g., maps) in a parking lot to pick up the passenger and to exit the parking lot to return on the HD map.

At least some of above described examples of feedback can be used, for example, in an autonomous system where rules are explicitly stated, such as in the case of expert systems.

In cases where automated solutions may be derived using machine learning techniques, the feedback can consist in the ground truth of the features, features values, and/or actual solution the tele-operator thinks the system should have generated. Given such ground truth for a given situation, a learning algorithm of the autonomous can incorporate (e.g., via training) the ground truth into the system to improve the automatic solution generation when similar situations arise in the future.

In another example of providing the feedback, such as to a perception sub-system of the autonomous system, the tele-operator can use pointing device (such as a mouse) to highlight the objects that the autonomous system missed (i.e., did not identify and/or did not correctly identify). By coupling a highlighted object to the list of features available concerning this specific object, the autonomous system, via training, would be able to determine correctly that this specific object is present the next time a similar situation arises.

To summarize, the feedback from the tele-operator can include, but is not limited to, zero or more of corrected feature values for features that have been identified incorrectly; confirmation of the features and/or feature values that have been identified correctly in order to increase the confidence level of predictions; feature values for the features that were not identified but were present in the exception situation; further refinements of the verified solution so that improved solutions can later be provided for each situation encountered; and/or responses/corrections to the automatic solution, which may be wrong or could be improved.

In some examples, modifying, adding, or deleting a codified rule by a tele-operator amounts to a proposed change that may not take effect until further approval and/or validation.

At 1018, in a case that the tele-operator is available, and an AV is also available, the tele-operator can navigate the AV to a zone (e.g., a location, a road, a construction site, etc.) where exception situations are frequently encountered. In this way, when the AV arrives at the zone, the AV will encounter an exception situation thereby triggering the exception situation 1004 of the technique 1000. In this way, new tickets can be generated, at 1006, specifically for training purposes, thereby benefiting from the downtime of the tele-operator and the AV to further train the automatic situation assessment and/or the automatic solution generations capabilities of the technique 1000.

Figure 11:
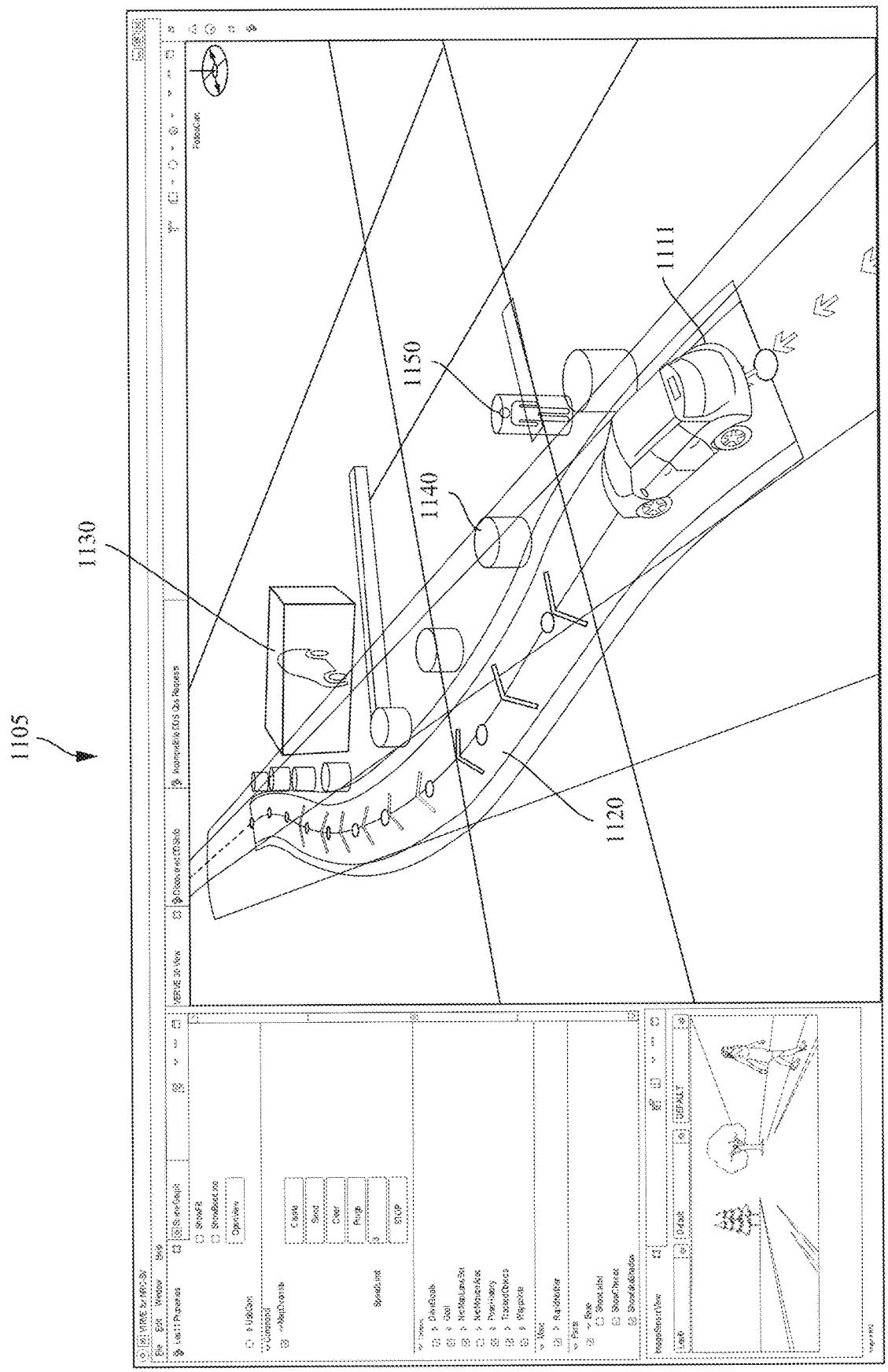
FIG. 11 is a screenshot illustrating an example of a vehicle manager interface according to implementations of this disclosure.

FIG. 11 is a screenshot illustrating an example of a vehicle manager interface 1105 according to implementations of this disclosure. The vehicle manager interface 1105 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 1105 can be generated by the controller apparatus 2410, based on instructions that are interpreted by a client computing device that accesses the controller apparatus 2410 through a computer network. The client computing device can then generate a representation of the vehicle manager interface 1105 on a display device.

The vehicle manager interface 1105 includes a vehicle indicator 1111, a path indicator 1120, an external object indicator 1130, an obstruction indicator 1140, a pedestrian indicator 1150, any of which can be based on data associated with the state of physical objects including but not limited to at least one of vehicles, roadways, buildings, and pedestrians. A plurality of configurations of external objects, obstructions, pedestrians, and any combination thereof can be displayed on the vehicle manager interface 1105. The vehicle indicator 1111 can be used to represent a vehicle. In this example, the vehicle is represented as a three dimensional model, however the vehicle indicator 1111 can be represented in different ways including any of a two dimensional image and a pictogram, such as an icon.

The path indicator 1120 can be used to represent a path between the current vehicle location and a vehicle destination. In an implementation, a vehicle manager can guide the vehicle associated with the vehicle indicator 1111 along the path indicated by the path indicator 1120, such as by transmitting a validated solution that includes the path of the path indicator 1120 to the vehicle. In an example, the path indicator 1120 can indicate a path that is, or is part of, an automatic solution. For example, when providing remote assistance to a vehicle associated with the vehicle indicator 1111, a path indicator such as a virtual lane can be generated in order to provide a visual representation of the path that the vehicle can travel on that is illustrated by the path indicator 1120.

The external object indicator 1130 can be used to represent external objects such as other vehicles that could change the intended route of the vehicle as an example. The obstruction indicator 1140 can be used to represent external objects that can obstruct the movement of the vehicle represented by the vehicle indicator 1111. The pedestrian indicator 1150 can be used to represent an external object including a pedestrian or a cyclist or another moving object. The pedestrian indicator 1150 can be indicated with a distinctive color scheme that is different from other external objects represented by the external object indicator 1130 or the obstruction indicator 1140. In this way, pedestrians can be distinguished from other types of external objects to provide additional awareness and avoidance capabilities. In an implementation, the external object indicator 1130, the obstruction indicator 1140, and the pedestrian indicator 1150, or any combination thereof, can be represented by the same or similar type of indicator that covers all objects that could affect at least one parameter (e.g., route, travel time, etc.) of the vehicle represented by the vehicle indicator 1111. In an example, and as described above, the technique 1000 may have identified a pedestrian that is indicated by the pedestrian indicator 1150. However, a role of that pedestrian may be provided by the tele-operator. As also, described above, the tele-operator may have drawn the external object indicator 1130, illustrated as a rectangular prism to identify the external object as a large vehicle.

Figure 12:
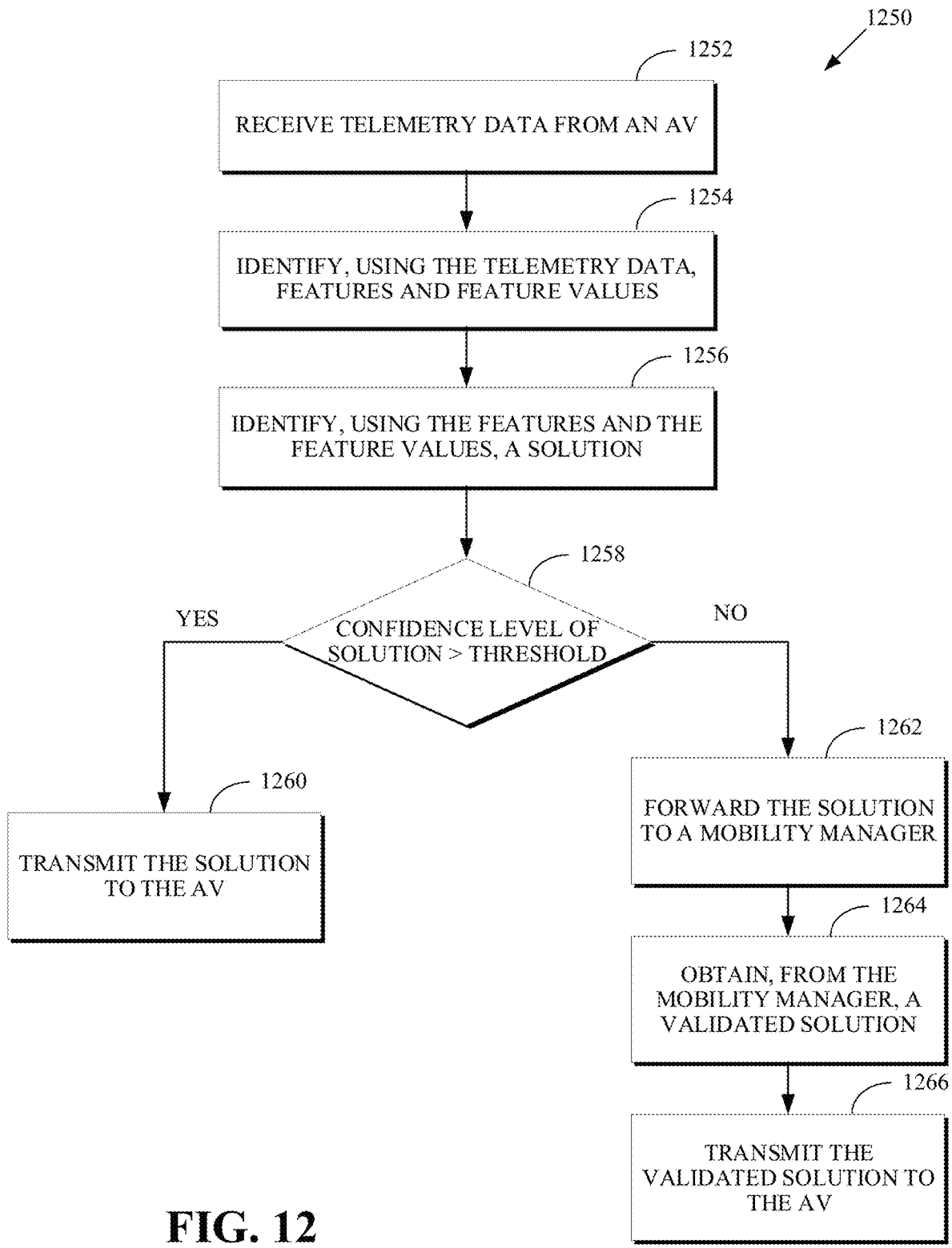
FIG. 12 is a flow chart of a technique for resolving an exception situation in autonomous driving according to an implementation of this disclosure.

FIG. 12 is a flow chart of a technique 1250 for resolving an exception situation in autonomous driving according to an implementation of this disclosure. The technique 1250 can be performed, partially or fully, by an autonomous system. The technique 1250 can be stored as instructions in a memory of the autonomous system and executed by a processor of the autonomous system. In an example, the autonomous system can be, or can be performed by, a controller apparatus, such as the controller apparatus 2410 of FIG. 2. When an autonomous vehicle (AV) encounters an exception situation, the technique 1250 can transmit to the AV a solution to the exception situation. At least some aspects and steps of the technique 1250 can be as described with respect to FIG. 10.

At 1252, the technique 1250 receives telemetry data from the AV, as described with respect to FIG. 10. At 1254. The technique 1250 identifies, using the telemetry data, features and feature values, as described above with respect to FIG. 10. In some examples, as already mentioned, the features and/or feature values can be identified based on additional data that are received from the AV. At 1256, the technique 1250 identifies, using the features and the feature values, a solution (i.e., an automatic solution) to the exception situation, as described above.

A confidence level can be determined for the automatic solution, as described above. At 1258, if the confidence level is greater than a threshold value, then the technique 1250 proceeds to 1260; if the confidence level is not greater than the threshold value, then the technique 1250 proceeds to 1262.

At 1260, the technique 1250 transmits the solution to the AV, as described above. As such, in response to the confidence level exceeding a threshold (i.e., the threshold level), the technique 1250 transmits the solution to the AV.

At 1262, the technique 1250 forwards the solution to a mobility manager (i.e., a tele-operator), as described above with respect to the path 1040. At 1264, the technique 1250 obtains (e.g., receives), from the mobility manager, a validated solution, as described above with respect to FIG. 10. At 1266, the technique 1250 transmits the validated solution to the AV, as described with respect to 1012 of FIG. 10. As such, in response to the confidence level exceeding a threshold, transmitting the solution to the AV, the technique 1250 forwards the solution to a mobility manager; obtains, from the mobility manager, a validated solution; and transmits the validated solution to the AV.

In an example, the technique 1250 can include, subsequent to transmitting the solution to the AV, forwarding the solution to the mobility manager, as described above with respect to the path 1020 of FIG. 10. In an example, the technique 1250 can include, subsequent to transmitting the validated solution to the AV, forwarding the validated solution to the mobility manager, as described with respect to the path 1022 of FIG. 10.

In an example, obtaining, from the mobility manager, the validated solution can include receiving, from the mobility manager, an updated feature value for a feature of the features. In an example, obtaining, from the mobility manager, the validated solution can include receiving, from the mobility manager, a new feature and a new feature value based on the telemetry data, wherein the new feature is not included in the features. In an example, identifying, using the features and feature values, the solution to the exception situation can include receiving feedback from the mobility manager; and using the feedback from the mobility manager to identify the solution. The feedback from the mobility manager can relate to at least one of a feature of the features, a feature value of the feature values, or a subset of the telemetry data. In an example, the technique 1250 can include training an exception handling system (i.e., an autonomous system) using the feedback from the mobility manager, as described with respect to 1016, 1024 and/or 1026 of FIG. 10. In an example, the technique 1250 can include, as described with respect to 1018 of FIG. 10, receiving a first instruction from the mobility manager to navigate the AV to a location of the exception situation; and transmitting a second instruction to the AV to navigate to the location of the exception situation.

Another aspect of the disclosed implementations is a system for resolving an exception situation in autonomous driving. The system can be an autonomous system, as described above. The system includes a memory and a processor. The processor is configured to execute instructions stored in the memory to receive, from an first autonomous vehicle (AV), a first request for assistance to resolve an first exception situation encountered by the first AV; generate a first automatic solution to the first exception situation; on condition that a confidence level in the first automatic solution does not exceed a threshold, obtain from a first mobility manager a validated solution; transmit, as a transmitted solution, one of the first automatic solution or the validated solution to the first AV; subsequent to transmitting the transmitted solution to the first AV, forward the transmitted solution to a second mobility manager for review; receive a feedback from the second mobility manager; receive, from a second AV, a second request for assistance to resolve a second exception situation encountered by the second AV; and generate, using at least the feedback from the second mobility manager, a second automatic solution to the second exception situation.

The transmitted solution is one of the automatic solution or the validated solution. If the confidence level in the first automatic solution exceeds the threshold, then the validated solution is not obtained. As such, the automatic is the transmitted solution. If the confidence level in the first automatic solution does not exceed a threshold, then the validated solution is obtained, and it is the solution that is transmitted to the AV. It is noted that, as described above, the validated solution may be the automatic solution, if the mobility manager authorizes (e.g., accepts, validates) the automatic solution. In an example, the first exception situation can be an obstruction situation.

As described above resolving exception situations can involve a combination of autonomous decision making by a vehicle (such as via artificial intelligence and/or machine learning techniques) and human (e.g., a tele-operator) intervention. When an AV cannot resolve an exception situation on its own (i.e., using the programming of the AV), the AV can issue a request for assistance. As mentioned above, a tele-operator can have a better situational awareness of an exception situation by receiving information from an AV that includes raw sensor data, features, feature values, camera images and the like. The tele-operator can selectively review (e.g., analyze) at least a subset of the received data to gain an awareness of the situation so that the tele-operator is better positioned to provide a validated solution.

To make the tele-operator even more situationally aware, thereby enabling the tele-operator to more effectively and quickly resolve an exception situation, the tele-operator can review the lead-up to the exception situation. For example, the tele-operator can review the events, conditions, and the like, that resulted in (e.g., led to, caused, contributed to, etc.) the exception situation. That is, the tele-operator can review historical information immediately preceding the exception situation. As such, in some implementations, the tele-operator can review a last predetermined number of seconds of data preceding the exception situation. In an example, the predetermined number of seconds can be 10 seconds, 20 seconds, 60 seconds, more seconds, or fewer seconds. A review of historical information immediately preceding the exception situation is referred to herein as "playback." Using the playback, the tele-operator is able to better understand the exception situation and make the appropriate countermeasures (e.g., generate a verified solution, as described above).

Figure 13:
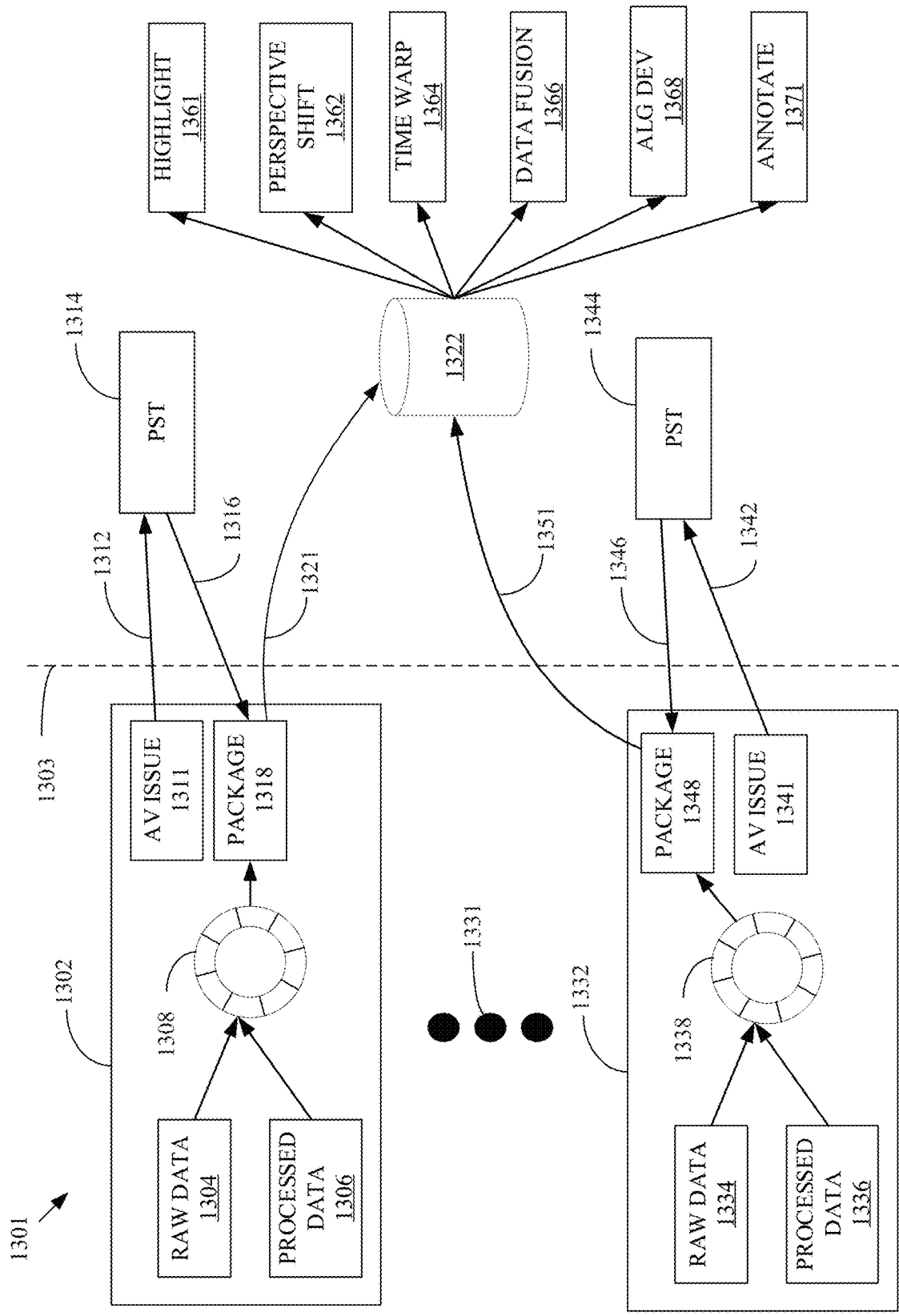
FIG. 13 is a block diagram of an example of playback according to implementations of this disclosure.

FIG. 13 is a block diagram of an example 1301 of playback according to implementations of this disclosure. A dashed line 1303 illustrates that two environments are involved in the example 1301.

The left hand side of the dashed line 1303 illustrates an environment in which vehicles 1302 and 1332 operate. That is, the left hand side can be a part of a vehicle transportation and communication system, such as the vehicle transportation and communication system 2000 of FIG. 2, where vehicles operate. The vehicle transportation and communication system can include other vehicles than the vehicles 1302 and 1332 as illustrated by an ellipsis 1331. Each of the vehicles 1302 and 1332 can be a vehicle (e.g., an autonomous vehicle or a semi-autonomous vehicle) including the vehicle 1050 shown in FIG. 1, the vehicle 2100 shown in FIG. 2, or one of the vehicles 340/350/360/370 of FIG. 3.

The right hand side of the dashed line 1303 illustrates an autonomous system, such as described with respect to FIG. 10. As described above, the autonomous system can receive requests for assistance from vehicles in the vehicle transportation and communication system, such as described with respect to FIG. 10. A tele-operator may review an automated solution that is generated by the autonomous system, as described with respect to the block 1014 of FIG. 10. In an example, the autonomous system may not generate an automated solution. Rather, the tele-operator can authorize, reject, and the like, a solution (e.g., trajectory) that is proposed by the AV, such as described with respect to FIGS. 5-9.

More broadly, the right hand side of the dashed line 1303 can represent a cloud-based system that can be a remote vehicle assistance center, such as described with respect to FIG. 3 and the left hand side of the dashed line 1303 represents, not just a vehicle (autonomous or otherwise) operating in the real world, but any other agent(s) of the real world. Such agents can be agents operating in a vehicle transportation and communication system, such as described with respect to FIG. 2 and are capable of communicating to the right hand side of the dashed line 1303 information such as infrastructure data, agent-specific data (e.g., agent-specific status), other world object data. Examples of agents of the real world include autonomous vehicles, traffic lights, infrastructure components, and the like. As such, the vehicles 1302 and 1332 can also be referred to as agents.

In the normal operation of the vehicle 1302, the vehicle 1302 (i.e., modules thereof) can be continuously receiving raw data 1304. The raw data can be raw data as described above. For example, the raw data can include camera images, LiDAR point clouds, the GPS location of the vehicle 1302, the speed of the vehicle 1302, more, fewer, other raw telemetry or sensor data, or a combination thereof. The vehicle 1302 (or, more specifically, modules thereof) can process the raw data 1304 to generate at least some of processed data 1306. For example, the processed data 1306 can include, as described above, features, feature values, information regarding other world objects, hypotheses associated with at least some of the other world objects, more, fewer, other processed data, or a combination thereof. The vehicle 1302 uses the raw data and/or the processed data to autonomously operate. For example, the vehicle 1302 (i.e., modules thereof) can use the raw data and/or the processed data to make driving (e.g., trajectory) decisions, to identify exception situation, and the like.

In an example, the vehicle 1302 may not retain data (e.g., raw data or processed data) that are not subsequently required for autonomous operations. For example, LiDAR data, camera images, and the like, once processed (such as to identify correspondence to world objects) may not be retained (e.g., stored). In another example, all raw data and/or processed may be stored in a memory of the vehicle 1302.

In anticipation of an exception situation possibly occurring at a predetermined number of seconds from a current time, the vehicle 1302 can include a recoding module that records (e.g., stores, saves, etc.) data related to autonomous driving. For description purposes only, the predetermined number of seconds is considered to be 10 seconds; however, the disclosure herein is not so limited. The data related to autonomous driving can include raw sensor data. The data related to autonomous driving can include actuator data. The data related to autonomous driving can include processed data that are generated from raw sensor data, other telemetry data, and/or actuator data. The data related to autonomous driving can include other world objects, states and/or hypotheses associated with at least some of the other world objects, and/or other data that are maintained by the vehicle 1302 with respect to the other world objects.

The raw data 1304 and/or the processed data 1306 can be stored in a memory 1308. At every time increment, a recording module (not shown) can take a snapshot of the data related to autonomous driving and store that snapshot in the memory 1308. The time increment can be 10 milliseconds, 20 milliseconds, or other time increment. As such, the memory 1308 can include snapshots corresponding to each time increment for the predetermined number of seconds. As such, in the case that predetermined number of seconds is 10 seconds and the time increment is 10 milliseconds, the memory 1308 can include at least 600 snapshots. The memory 1308 can include significantly more snapshots than the snapshots of the predetermined number of seconds.

In an example, the memory 1308, or some other module of the vehicle 1302, can maintain time indicators of when exception situations occur. For example, it may be determined (e.g., maintained) that exception situations occurred at times $T_1$, $T_2$, and $T_N$. As such, and as further described below, when snapshots corresponding to the exception situation occurring that the time $T_2$ are requested (e.g., pulled) by a tele-operator, the snapshots corresponding to $T_2$ minus the predetermined number of seconds are transmitted.

In an example, the memory 1308 can be a circular buffer (as shown in FIG. 13). A circular buffer can be a first-in-first-out (FIFO) memory buffer of limited capacity. The circular buffer can be thought as including a fixed number of slots, N. A first snapshot can be stored at a first slot of the circular buffer, a second snapshot can be stored at a second slot of the circular buffer, and an $N^{th}$ snapshot can be stored at the $N^{th}$ slot of the circular buffer. An $(N+1)^{th}$ snapshot can be stored at a first slot of the circular buffer, thereby replacing (e.g., overwriting) the first snapshot, an $(N+2)^{th}$ snapshot can be stored at the second slot of the circular buffer, thereby replacing (e.g., overwriting) the second snapshot, and so on.

A block 1311 illustrates that, in response to identifying an exception situation, such as described with respect to 502 of FIG. 5 or 1004 of FIG. 10, a request for assistance is issued by the vehicle 1302 to the autonomous system. The request is indicated by an arrow 1312, which indicates a request from the left hand side of the dashed line 1303 to the right side (i.e., the autonomous system side).

A playback system trigger (PST) 1314 of the autonomous system can be used by the tele-operator that is responding to a ticket (such as described with respect to 1014) to cause (as shown by an arrow 1316) playback data (i.e., the snapshots corresponding to the exception situation) to be received from the vehicle 1302. That is, the tele-operator can cause the playback data to be pulled (e.g., requested, etc.), on demand, from the vehicle 1302. In another example, the playback data can be transmitted by the vehicle 1302 with, or contemporaneously with, the request for assistance. Whether the playback information is pushed by or pulled from the vehicle 1302, such information is collectively referred to as transmitted playback information. A transmission module 1318 can transmit the playback data (i.e., the data related to autonomous driving) for review by the tele-operator. In an example, the transmission module 1318 can package and/or compress the playback data before transmitting the data to the PST 1314. Packaging can mean preparing the playback snapshots in a format suitable for transmission. In an simple example, the snapshots to be transmitted can be packaged into one or more files (e.g., zip, tar, the like) files for transmission. Packaging can include encrypting the playback snapshots.

In an example, the PST 1314 can request data from other agents that are in the vicinity of the exception situation. For example, if the vehicle 1302 experiences an issue (i.e., an exception situation), and the vehicle 1332 is close to the vehicle 1302, the PST 1314 determines that the vehicle 1332 is in the vicinity and can request playback data from both agents (i.e., the vehicle 1302 and the vehicle 1332).

The snapshot data can be compressed before transmission by the transmission module 1318. Any suitable compression techniques can be used. In an example, each data type that is included in a snapshot can be compressed using techniques suitable for that data type. For example, camera images may be compressed using JGEP or any other image compression techniques. For example, LiDAR data can be compressed using numerically lossless compression, such as using the Lizard-Tech LiDAR Compressor, LASzip compressor, or any other LiDAR data compressor. In an example, the playback data can be compressed before being stored in the memory 1308.

In an example, a recipient (e.g., the autonomous system) of the data related to autonomous driving may include programming that is identical (or sufficiently identical) to that of the recording vehicle (e.g., the vehicle 1302). As such, the autonomous system can exactly generate at least some of the processed data that are generated by the vehicle from raw sensor data. As such, the data related to autonomous driving need not include such processed data (i.e., the processed data that can be generated by the autonomous system). As such, in some examples, even if processed data 1306 is stored in the memory 1308, at least some of the processed data are not packaged and transmitted by the transmission module 1318.

The data related to autonomous driving that are transmitted by the transmission module 1318 can be received, as shown by an arrow 1321, at the autonomous system and stored in a memory 1322. The memory 1322 can be, for example, a database, a file system, or any suitable data storage mechanism.

With respect to the vehicle 1332, raw data 1334, processed data 1336, a memory 1338, a transmission module 1348, a block 1341, an arrow 1342, an arrow 1346, and an arrow 1351 are as described, respectively, with respect to the raw data 1304, the processed data 1306, the memory 1308, the transmission module 1318, the block 1311, the arrow 1312, the arrow 1316, and the arrow 1321.

While one use of the data related to autonomous driving is mentioned above (namely, for review of the exception situation by a tele-operator), the data related to autonomous driving can be used in many different ways and by many different constituents. A subset of such uses are illustrated in FIG. 13.

With respect to review of the exception situation by a tele-operator, while the 10 seconds of the data related to autonomous driving are being played back at a user interface of the tele-operator, the object(s) that caused and/or contributed to the exception situation can be highlighted as shown by a block 1361. As such, the block 1361 can be thought of as going backwards in time to highlight the reasons for the exception situation. For example, the block 1361 can be a module, a set of executable instructions, or the like, that can, starting from a last snapshot in the playback data, identify the object(s) that caused the exception situation, identify the object(s) in every previous snapshot, and, during playback, highlight the object(s). In an example, highlighting can include drawing bounding box(es) around the object(s) during the playback. In an example, the playback can include processed data. For example, during playback, features and feature values may be displayed for the tele-operator. In an example, the processed data can be displayed in response to the tele-operator selecting (e.g., pointing at) an object in the playback.

As the vehicle 1302 can include more than one camera, a block 1362 can allow a tele-operator to shift perspectives. The playback data can include data from more than one camera and/or more than one agent. For example, the block 1362 can receive an instruction from a tele-operator to play the playback data from a different perspective. For example, instead of viewing the playback data from the perspective of a front-facing camera of the vehicle 1302, the playback may be from the perspective of a rear-view, a side-view camera, an internal camera, or some other camera. With the perspective from an internal camera, the tele-operator can, for example, see what a passenger was doing leading up to the exception situation. With the perspective from the different external cameras, the tele-operator can, for example, identify obstructing objects, identify objects that can be navigated around, etc.

In an example, the tele-operator can view, such as on a split screen, the playback from multiple perspectives, simultaneously. In another example, the autonomous system (i.e., the right hand side environment of FIG. 13) may receive playback information (i.e., neighboring vehicle data related to autonomous driving) from other vehicles that are proximal to the vehicle 1302. As such, the memory 1322 can include neighboring vehicle data related to autonomous driving. In some examples, the block 1362 can include identifying proximal vehicles, presenting a list of the proximal vehicles to the tele-operator, receiving an instruction from the tele-operator to display the playback information of a proximal vehicle that is selected from the list, and playing back the neighboring vehicle data related to autonomous driving. In an example, the proximal vehicles can be identified based on location information of the proximal vehicles relative to the vehicle 1302.

A block 1364 can allow the tele-operator to play the playback information at different speeds (e.g., slower or faster than the recoding/capturing speed) and/or forward, rewind, or pause the playback information. For example, if the playback time is 60 s and the only times where there is activity is between 35-40 s ago, the time warp may playback at 5× (i.e., 5 times the normal playback speed) from 60 s to 40 s, at 2× from 40 s to 35 s, and at 5× from 35 s to now. At a block 1366, sensor data from several sensors can be fused together to determine (e.g., guess the existence of and/or identities of) real world objects that are in the scene of the exception situation. In an example, raw data from sensors of other real world agents (e.g., other vehicles) that are in the scene of the exception situation and/or are proximal to the vehicle 1302 can also be fused with the sensor data of the vehicle 1302.

A block 1371 can allow the tele-operator to annotate the playback, such as during an offline operation, as described with respect to 1016 of FIG. 10. Any annotations provided by the tele-operator can be associated with (e.g., related to) one of the data related to autonomous driving as a whole, one or more snapshots therein, or the playback therefrom. An annotation can include descriptive information related to the exception situation, the performance of the autonomous vehicle, or some other annotation information. For example, an annotation can describe why and/how the AV encountered and/or identified the exception situation. For example, an annotation can describe a misclassification and/or mischaracterization of an object, a feature, and/or a feature value by the AV.

Annotations can be used to improve the performance of an AV. Annotations can also be used for compliance reporting. For example, governmental regulations may require reporting of incidents when an AV does not perform as expected. For example, the exception situation may be that the AV was involved in an accident, which was caused because the AV should have stopped behind an obstacle but did not and, instead, proceeded to get around the obstacle by driving in a lane of the oncoming traffic. As such, an annotation can provide a synopsis and analyze of the exception situation including reasons why the AV should not have driven in the lane of the oncoming traffic in this particular situation.

The tele-operator can also categorize the exception situation. For example, the tele-operator can categorize the exception situation as a sensor failure, an algorithmic failure, some other failure, a new situation, or a combination thereof. The tele-operator can identify that the exception situation (i.e., the new situation) was beyond the programming of the AV. That is, the algorithms of the AV were not designed to handle the exception situation.

At least in the cases of algorithmic failures and/or new situations, programmers (e.g., developers) can use the annotations, the playback, and/or at least some of the data related to autonomous driving to improve the programming of the AV, as shown by a block 1368 (algorithm developers).

Figure 14:
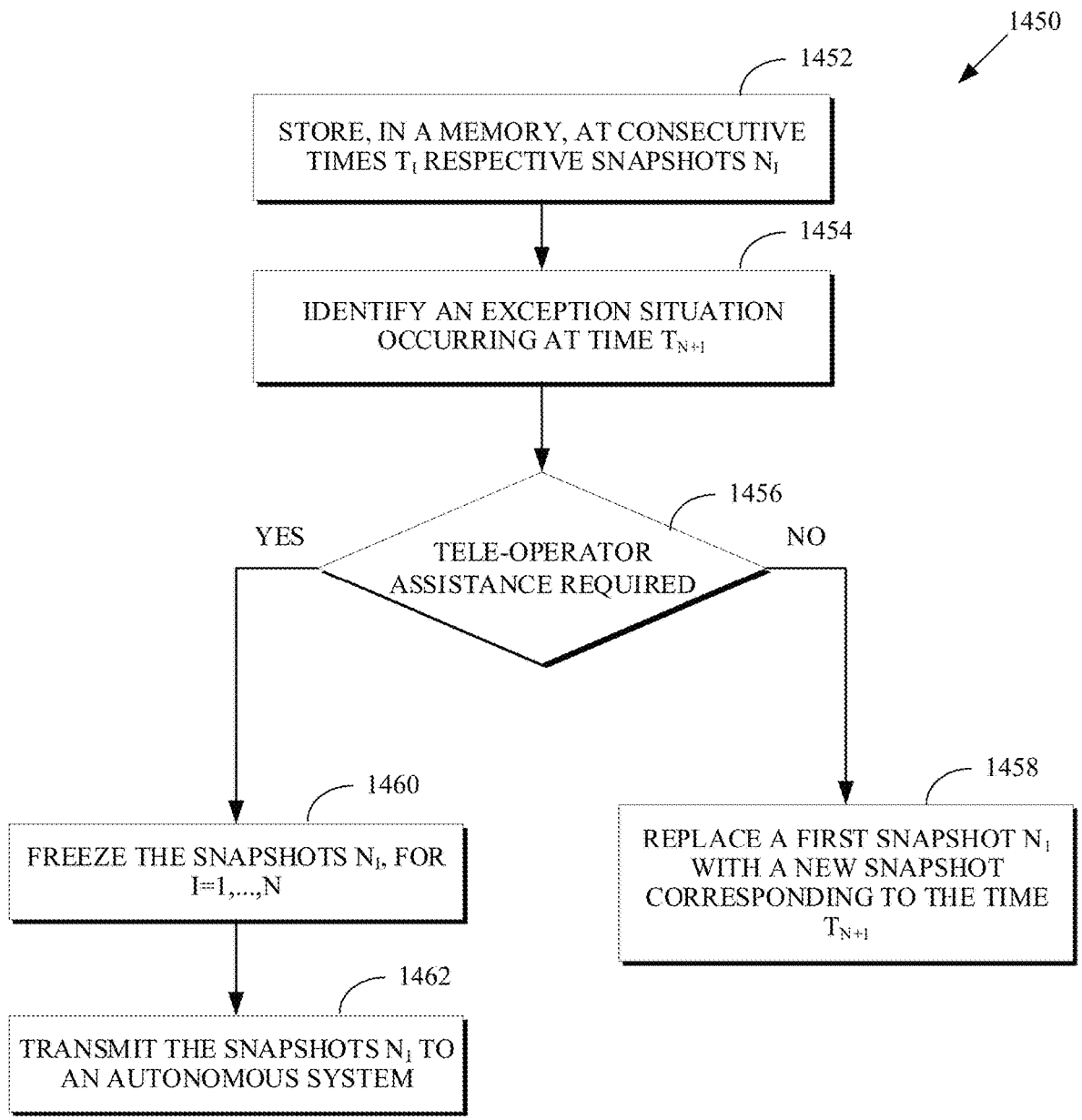
FIG. 14 is a flow chart of a technique for recording exception situations by an autonomous vehicle (AV) according to implementations of this disclosure.

FIG. 14 is a flow chart of a technique 1450 for recording exception situations by an autonomous vehicle (AV) according to implementations of this disclosure. Some or all of the technique 1450 can be implemented in a vehicle (e.g., an autonomous vehicle) including the vehicle 1050 shown in FIG. 1, the vehicle 2100 shown in FIG. 2, or one of the vehicles 340/350/360/370 of FIG. 3. The technique 1450 can be executed, partially or fully, by at least some of the modules of the system 400 of FIG. 4.

At 1452, the technique 1450 stores, in a memory, at consecutive times $t_i$ respective snapshots $n_i$ of data related to autonomous driving, for i=1, ..., N, such as described with respect to the memory 1308 of FIG. 13. As mentioned above, the data related to autonomous driving can include raw sensor data, actuator data, processed data, other data, or a combination thereof. At 1454, the technique 1450 identifies an exception situation occurring at time $t_{n+1}$. The exception can occur at a time between $t_n$ and $t_{n+1}$. However, since the time ($t_{n+1}-t_n$) is in the range of a few milliseconds, for convenience, the exception situation can be considered as occurring at time $t_{n+1}$. In an example, the exception situation can be identified as described with respect to 502 of FIG. 5.

At 1456, the technique 1450 determines whether tele-operator assistance is required. In response to determining that tele-operator assistance is not required, the technique 1450 proceeds to 1458. In response to determining that tele-operator assistance is required, the technique 1450 proceeds to 1460. In an example, the technique 1450 determines that tele-operator assistance is required in response to a risk associated with autonomously resolving the exception situation exceeding a risk threshold, as described with respect to FIG. 5.

At 1458, the technique 1450 replaces a first snapshot $n_1$ with a new snapshot corresponding to the time $t_{n+1}$ such as described above with respect to the memory 1308 of FIG. 13 when the memory 1308 is a circular buffer. As such, a first snapshot $n_1$ can be stored at a location L of the circular buffer and replacing the first snapshot $n_1$ with the new snapshot corresponding to the time $t_{N+1}$ can include replacing the first snapshot $n_1$ at the location L with the new snapshot.

At 1460, the technique 1450 freezes the snapshots $n_i$, for i=1, ..., N. That is, the technique 1450 does not overwrite any of the snapshots $n_i$ with a new snapshot corresponding to the time $t_{n+1}$. In an example, the technique 1450 does not take additional snapshots until the exception situation is resolved. In an example, the technique 1450 continuous to take additional snapshots after the exception situation occurs. However, the additional snapshots are stored in another circular buffer.

At 1462, the technique 1450 transmits the snapshots $n_i$ to an autonomous system. The autonomous system can be as described with respect to the right hand side of the dashed line 1303 of FIG. 13. In an example, the snapshots can be transmitted such as described with respect to the transmission module 1318 of FIG. 13. In an example, transmitting the snapshots $n_i$ to the autonomous system can include transmitting the snapshots $n_i$ to the autonomous system in response to receiving a request from the autonomous system for the snapshots $n_i$. In an example, the request from the autonomous system can be a pull request for the snapshots. The pull request may be received from, or on behalf of, the tele-operator. That is, the snapshots $n_i$ can be transmitted on demand (such as when requested by a tele-operator).

While not specifically illustrated in FIG. 14, the blocks 1460 and 1462 can be performed by another agent (e.g., another vehicle) that has not itself encountered an exception situation. That is, the blocks 1460 and 1462 can be triggered (i.e., performed) in response to an exception situation occurring on a different AV. The blocks 1460 and 1462 can be referred to, collectively, as packaging and transmitting data. As mentioned above, packaging and transmitting data can include compressing and/or encrypting the data before transmission.

In an example, a first agent (e.g., the vehicle 1332) can be automatically notified that a second agent (e.g., the vehicle 1302, which is proximal to the vehicle 1332) has identified an exception situation for which tele-operator assistance is required. An example notification can essentially be stated in English as "on May 23, 2019 at 1:45:00:34, vehicle id 4568, requested assistance for exception situation id 54AF6." In an example, the second agent can broadcast such as message. In an example, a transportation network can broadcast such as message. The first agent may be notified in some other ways. Accordingly, the first agent can freeze snapshots $N_f$ (as described with respect to 1460), associate those snapshots with the second agent, and transmit the snapshots $N_f$, as described with respect to 1462. Associating the snapshots with the second agent can include, for example, associating an identity of the first agent, a time (e.g., a timestamp) of occurrence of the exception situation, more, fewer, other identifiers with the snapshots, or a combination thereof. In an example, the snapshots can be transmitted (at 1462) in response to a request for the snapshots wherein the request includes one or more identifiers associated with the snapshots.

Figure 15:
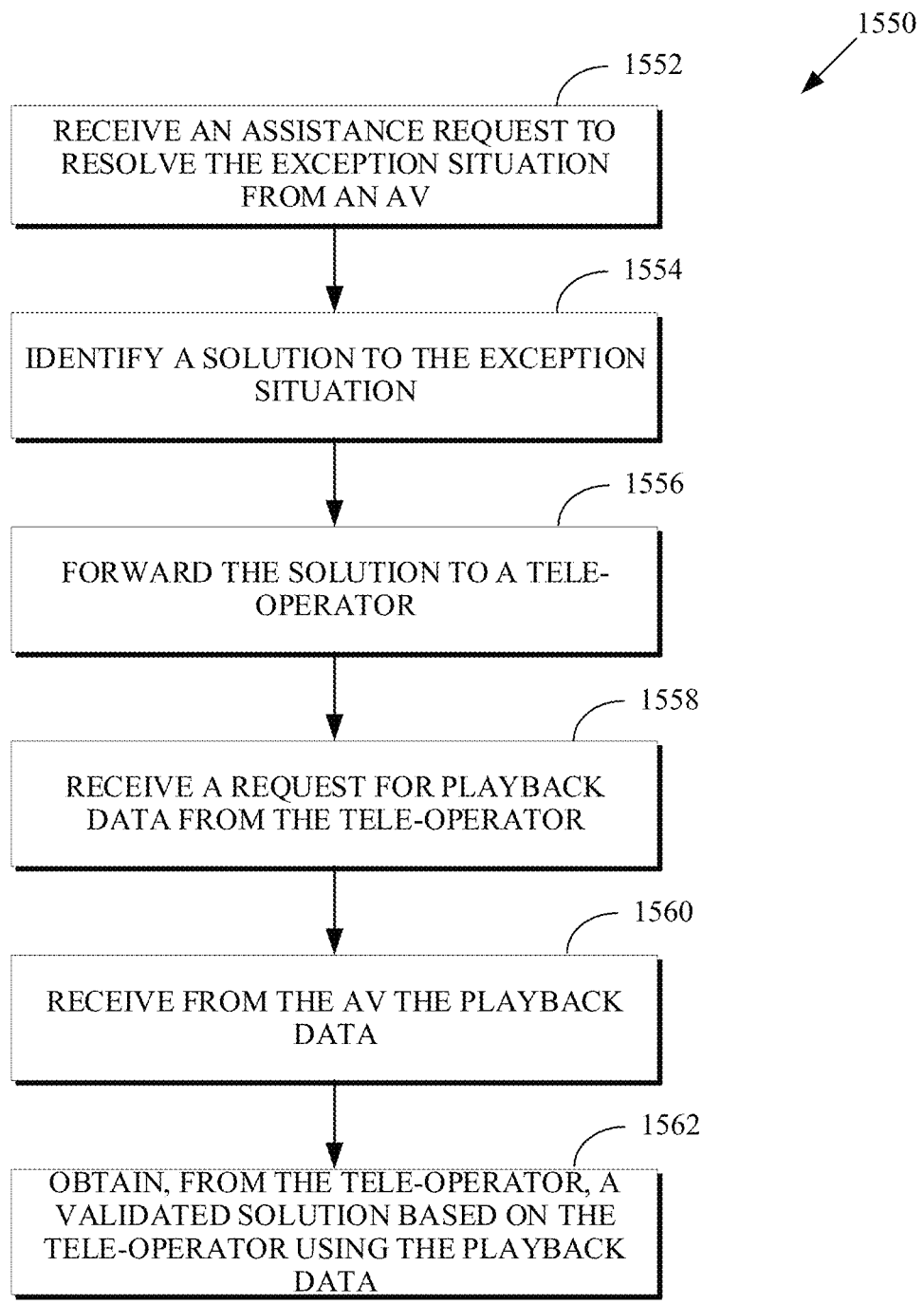
FIG. 15 is a flow chart of a technique for resolving an exception situation in autonomous driving according to an implementation of this disclosure

FIG. 15 is a flow chart of a technique 1550 for resolving an exception situation in autonomous driving according to an implementation of this disclosure. The technique 1550 can be performed, partially or fully, by an autonomous system. The technique 1550 can be stored as instructions in a memory of the autonomous system and executed by a processor of the autonomous system. In an example, the autonomous system can be, or can be performed by, a controller apparatus, such as the controller apparatus 2410 of FIG. 2. When an autonomous vehicle (AV) encounters an exception situation, the technique 1550 can transmit to the AV a solution to the exception situation. At least some aspects and steps of the technique 1550 can be as described with respect to FIG. 10.

At 1552, the technique 1550 receives an assistance request to resolve the exception situation from an autonomous vehicle (AV). The assistance request can be received as described with respect to FIG. 10. At 1554, the technique 1550 can identify a solution to the exception situation. The solution can be identified as described with respect to 1008 of FIG. 10. The solution can be identified as described with respect to 1256 of FIG. 12. At 1556, the technique 1550 forwards the solution to a tele-operator. In an example, the solution can be forwarded to the tele-operator in response to a confidence level associated with the solution being less than a threshold confidence level, as described with respect to 1258 of FIG. 12 and/or 1010 of FIG. 10.

At 1558, the technique 1550 receives a request for playback data from the tele-operator. In an example, while the tele-operator is reviewing the solution (i.e., the automated solution) as described with respect to 1014 of FIG. 10, the tele-operator can request (such as via a user interface control available to the tele-operator in the vehicle manager interface 1105 of FIG. 11 and/or the PST 1314 of FIG. 13) recorded data leading up to the exception situation from the AV, such as described with respect to the arrow 1316 of FIG. 13. The tele-operator can also request recorded data leading up to the exception situation from other agents that are/were within the scene of the exception situation (i.e., agents that are/were near the AV) at or near the time of the exception situation.

At 1560, the technique 1550 receives, from the AV, the playback data. The technique 1550 can also receive playback data from other agents, if playback data was also requested from other agents. As described above, the playback data can include snapshots $n_i$ of data related to autonomous driving stored at the AV at respective consecutive times $t_i$, for i=1, . . . , N. At 1562, the technique 1550 obtains, from the tele-operator, a validated solution based on the tele-operator using the playback data. The validated solution can be as described with respect to FIG. 10. As such, the validated solution can be transmitted to the AV.

In an example, obtaining, from the tele-operator, the validated solution based on the tele-operator using the playback data can include displaying sequentially, to the tele-operator, images from a front facing camera of the AV. In an example, obtaining, from the tele-operator, the validated solution based on the tele-operator using the playback data can include receiving, from the tele-operator, a perspective-shift command including a perspective and displaying sequentially, to the tele-operator, images from the perspective. For example, the perspective shift command can be a command to display data from the rear- or a side-facing camera instead of a front-facing camera.

In an example, the technique 1550 can include receiving, from the tele-operator, an annotation of the playback data. In an example, the playback data can be used in offline training, as described above with respect to FIG. 10. During offline training and review, such as described with respect to 1016 of FIG. 10, the tele-operator can provide an annotation to the playback data. As such, the technique 1550 can include receiving, from the tele-operator, an annotation of the playback data subsequent to transmitting the validated solution to the AV. In an example, the technique 1550 can include highlighting, in a playback of the playback data, real world objects causing the exception situation.

The steps, or operations, of any method, process, technique, or algorithm described in connection with the implementations of the disclosed technology herein, may be implemented in hardware, firmware, software executed by hardware, circuitry, or any combination thereof. To facilitate explanation, the techniques 500, 1000, 1250, 1450, and 1550 shown in FIGS. 5, 10, 12, 14 and 15 are depicted and described as a series of operations. However, the operations in accordance with this disclosure can occur in various orders or concurrently. Additionally, operations in accordance with this disclosure may occur with other operations not presented and described herein.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components to generate solutions associated with the operation and monitoring of autonomous vehicles. The development of new ways to generate solution data to, for example, generate solution data to address mechanical and electronic malfunctions in autonomous vehicles, or to overcome the limitations in programming of autonomous vehicles, is fundamentally related to autonomous vehicle related computer networks.

Implementations of this disclosure provide at least a system and method for the generation of solution data and transmission of the solution data to a vehicle or vehicles for execution (i.e., for using the solution data to solve an encountered issue/problem). The systems include a controller apparatus for generating state data for a vehicle using received sensor data. The state data can include any of a location, a destination, and an operational state of the vehicle. For example, the location of the vehicle can be generated based on map data associated with the vehicle that has been received from a global positioning satellite (GPS). In response to determining that the generated state data satisfies a state criterion, a determination of solution profile data that matches the state data is made on the basis of a comparison of the state data to the solution profile data. The solution profile data can be based on solutions from an aggregation of solution data from past events in which assistance was provided to an autonomous vehicle. Solution data can be generated based on the matching solution profile data and subsequently transmitted to the vehicle for execution. For example, the solution data can include a solution to a request for assistance from the driver of an autonomous vehicle.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resolving an exception situation in autonomous driving, comprising:
    receiving an assistance request to resolve the exception situation from an autonomous vehicle (AV);
    identifying a solution to the exception situation;
    forwarding the solution to a tele-operator;

receiving a request for playback data from the tele-operator;

receiving, from the AV, the playback data, wherein the playback data comprises snapshots $n_i$ of data related to autonomous driving stored at the AV at respective consecutive times $t_i$, wherein i=1, . . . , N;

displaying, to the tele-operator, a time-warp of the playback data such that a first portion of the playback data including activity related to the exception situation is played at a first speed and a second portion of the playback data not including any activity related to the exception situation is played at a second speed that is faster than the first speed;

highlighting, in a playback of the playback data and for display to the tele-operator, only real world objects causing the exception situation by:
  starting from a last snapshot in the playback data, identifying an object that caused the exception situation;
  identifying the object in every previous snapshot of the snapshots; and
  highlighting the object during the playback;

obtaining, from the tele-operator, a validated solution based on the tele-operator using the playback data; and autonomously operating the AV according to the validated solution.

2. The method of claim 1, further comprising:
prior to obtaining the validated solution from the tele-operator, sequentially displaying, to the tele-operator, images from a front facing camera of the AV.

3. The method of claim 1, further comprising:
receiving, from the tele-operator, a perspective-shift command including a perspective; and
sequentially displaying, to the tele-operator, images from the perspective.

4. The method of claim 1, further comprising:
receiving, from the tele-operator, an annotation of the playback data, the annotation describing the exception situation and a performance of the AV with respect to the exception situation.

5. The method of claim 1, further comprising:
transmitting the validated solution to the AV.

6. A method for recording exception situations by an autonomous vehicle (AV), comprising:
storing, in a memory, at consecutive times $t_i$ respective snapshots $n_i$ of data related to autonomous driving, wherein i=1, . . . , N;
identifying an exception situation occurring at time $t_{n+1}$;
in response to determining that an assistance of a tele-operator is not required, replacing a first snapshot $n_1$ with a new snapshot corresponding to the time $t_{n+1}$; and
in response to determining that the assistance of the tele-operator is required:
  freezing the snapshots $n_i$, for i=1, . . . , N;
  transmitting playback data comprising the snapshots $n_i$ to an autonomous system;
  notifying, via a notification, an agent proximal to the AV of the exception situation, wherein the notification comprises an identifier of the AV and an identification of the exception situation;
  displaying, to the tele-operator, at least a portion of the playback data;
  highlighting, while displaying the at least the portion of the playback data, real world objects causing the exception situation, wherein highlighting the real world objects causing the exception situation comprises:
    starting from a last snapshot in the playback data, identifying a real world object that caused the exception situation;
    identifying the real world object in every previous snapshot of the playback data; and
    highlighting the real world object while displaying the at least the portion of the playback data;
  receiving a validated solution from the tele-operator, wherein the tele-operator uses the snapshots $n_i$ to generate the validated solution; and
  operating the AV according to the validated solution.

7. The method of claim 6, wherein transmitting the snapshots $n_i$ to the autonomous system comprises:
transmitting the snapshots $n_i$ to the autonomous system in response to receiving a request from the autonomous system for the snapshots $n_i$.

8. The method of claim 6, wherein the memory is a circular buffer.

9. The method of claim 8,
wherein the first snapshot $n_1$ is stored at a location L of the circular buffer, and
wherein replacing the first snapshot $n_1$ with the new snapshot corresponding to the time $t_{n+1}$ comprises:
  replacing the first snapshot $n_1$ at the location L with the new snapshot.

10. The method of claim 6, wherein the data related to autonomous driving comprises raw sensor data.

11. The method of claim 6, wherein the data related to autonomous driving comprises processed data of raw sensor data.

12. The method of claim 6, wherein freezing the snapshots $n_i$, for i=1, . . . , N further comprises:
storing the new snapshot corresponding to the time $t_{n+1}$ in another memory that is different than the memory.

13. A system for resolving an exception situation in autonomous driving, comprising:
a memory; and
a processor, the memory includes instructions executable by the processor to:
  receive an assistance request to resolve the exception situation from an autonomous vehicle (AV);
  receive a request for playback data from a tele-operator;
  receive from the AV the playback data, wherein the playback data comprises snapshots $n_i$ of data related to autonomous driving stored at the AV at respective consecutive times wherein i=1, . . . , N;
  notify an agent proximal to the AV of the exception situation;
  receive, from the agent, agent playback data, wherein the agent freezes the agent playback data in response to being notified of the exception situation;
  starting from a last snapshot in the playback data, identify a real world object that caused the exception situation;
  identify the real world object in every previous snapshot of the playback data; and
  highlight the real world object while displaying the playback data to the tele-operator;
  obtain, from the tele-operator, a validated solution based on the tele-operator using the playback data and the agent playback data; and
  operating the AV according to the validated solution.

14. The system of claim 13, wherein the instructions further comprise instructions to:
sequentially display, to the tele-operator, images from a front facing camera of the AV.

15. The system of claim 13, wherein the instructions further comprise instructions to:
  receive, from the tele-operator, a perspective-shift command including a perspective; and
  sequentially display, to the tele-operator, images from the perspective.

16. The system of claim 13, wherein the instructions further comprise instructions to:
  receive, from the tele-operator, an annotation of the playback data.

17. The system of claim 13, wherein the instructions further comprise instructions to:
  transmit the validated solution to the AV.

18. The system of claim 13, wherein the instructions further comprise instructions to:
  receive, from the tele-operator, an annotation of the playback data, subsequent to transmitting the validated solution to the AV.

\* \* \* \* \*